US012382495B2

(12) United States Patent
Liu et al.

(10) Patent No.: US 12,382,495 B2
(45) Date of Patent: Aug. 5, 2025

(54) RECEIVER ASSISTED DIRECTIONAL CHANNEL SENSING FOR NR-U

(71) Applicant: Telefonaktiebolaget LM Ericsson (publ), Stockholm (SE)

(72) Inventors: Yuhang Liu, Lund (SE); Jung-Fu Cheng, Fremont, CA (US); Peter Alriksson, Hörby (SE); Tai Do, Lund (SE); Aliakbar Mirzaei, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 254 days.

(21) Appl. No.: 17/793,097

(22) PCT Filed: Feb. 1, 2021

(86) PCT No.: PCT/EP2021/052338
§ 371 (c)(1),
(2) Date: Jul. 15, 2022

(87) PCT Pub. No.: WO2021/156212
PCT Pub. Date: Aug. 12, 2021

(65) Prior Publication Data
US 2023/0041484 A1    Feb. 9, 2023

Related U.S. Application Data

(60) Provisional application No. 62/971,033, filed on Feb. 6, 2020.

(51) Int. Cl.
*H04W 74/08*    (2024.01)
*H04W 16/28*    (2009.01)
(Continued)

(52) U.S. Cl.
CPC ....... *H04W 74/0816* (2013.01); *H04W 16/28* (2013.01); *H04W 24/10* (2013.01)

(58) Field of Classification Search
CPC ..... H04W 16/14; H04W 16/28; H04W 24/10; H04W 72/21; H04W 74/0816
(Continued)

(56) References Cited

U.S. PATENT DOCUMENTS 11,277,865 B2 *   3/2022   Zhang ............... H04B 7/08
2017/0238341 A1 * 8/2017   Liu .................. H04W 72/0446
                                                        370/336
(Continued)

FOREIGN PATENT DOCUMENTS

WO    2019194603 A1    10/2019

OTHER PUBLICATIONS

"3GPP TS 38.211 V16.0.0", 3rd Generation Partnership Project; Technical Specification Group Radio Access Network; NR; Physical channels and modulation (Release 16), Dec. 2019, pp. 1-129.
(Continued)

*Primary Examiner* — Robert J Lopata
(74) *Attorney, Agent, or Firm* — Sage Patent Group

(57) ABSTRACT

A first group embodiments provide a method performed by a network node (NN) in a wireless network comprising responsive to a DL data intended for a user equipment (UE), transmitting a first short signal burst to the UE over a channel using a directional beam, and based on detecting a first response to the first short signal burst from the UE indicating that the channel is available, transmitting at least a portion of the DL data to the UE over the channel using the directional beam. A second group embodiments provide a method performed by a NN comprising determining availability of a channel between the network node and the UE using a directional beam, based on determining that the channel is available, transmitting a first resource grant for
(Continued)

transmission of a UL data by the UE, and receiving the UL data from the UE over the channel using the directional beam.

18 Claims, 13 Drawing Sheets

(51) Int. Cl.
*H04W 24/10* (2009.01)
*H04W 74/0816* (2024.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0352577 | A1* | 12/2018 | Zhang | H04B 7/08 |
| 2019/0090279 | A1* | 3/2019 | Sun | H04L 5/0055 |
| 2019/0268939 | A1 | 8/2019 | Yang et al. | |
| 2019/0274054 | A1* | 9/2019 | Salem | H04L 12/189 |
| 2019/0357255 | A1 | 11/2019 | Sun et al. | |
| 2020/0053737 | A1* | 2/2020 | Liu | H04W 24/08 |
| 2020/0314906 | A1* | 10/2020 | Goyal | H04B 7/0695 |
| 2020/0336921 | A1* | 10/2020 | Yerramalli | H04W 72/046 |
| 2020/0374932 | A1* | 11/2020 | Chen | H04W 74/0808 |
| 2021/0045158 | A1* | 2/2021 | Yerramalli | H04L 5/0023 |
| 2021/0250994 | A1* | 8/2021 | Sun | H04W 24/10 |
| 2021/0336735 | A1* | 10/2021 | Cui | H04L 5/0048 |
| 2022/0061031 | A1* | 2/2022 | Park | H04L 5/0094 |
| 2022/0124810 | A1* | 4/2022 | Zhang | H04W 16/14 |

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP TS 38.401 V15.7.0", 3rd Generation Partnership Project; Technical Specification Group Radio Access Network; NG-RAN; Architecture description (Release 15), Dec. 2019, pp. 1-47.

Unknown, "3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

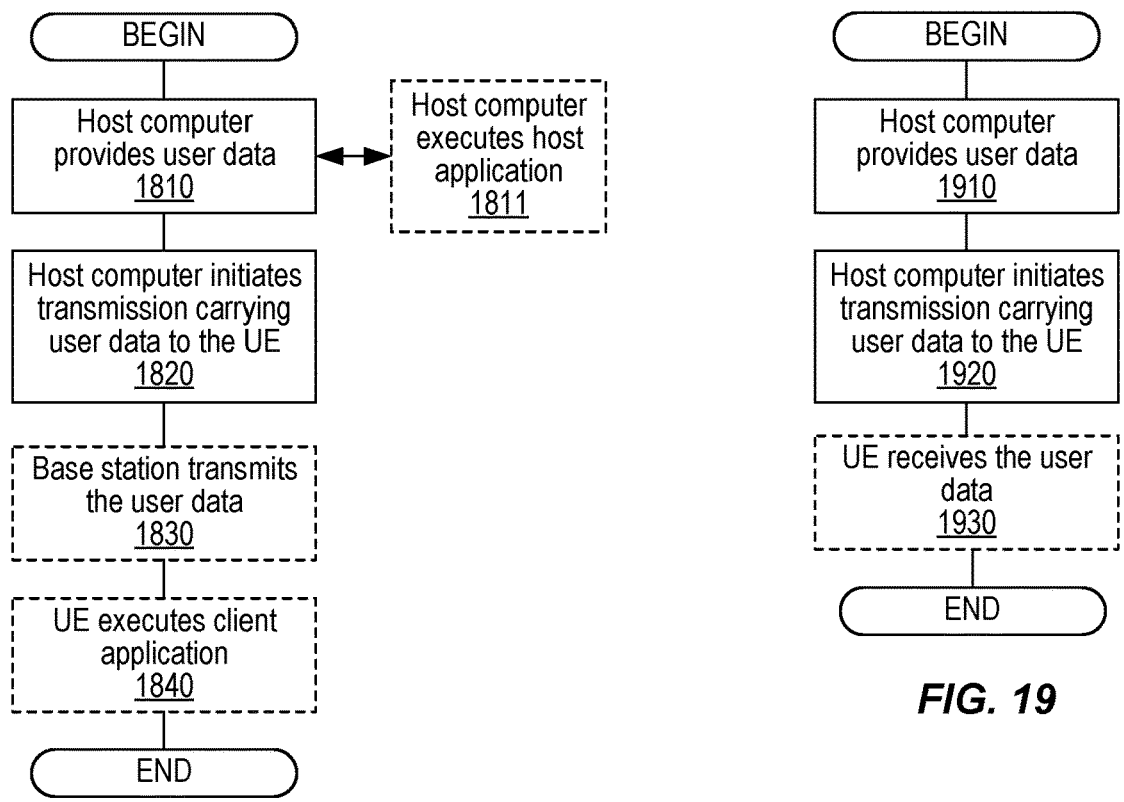
FIG. 18
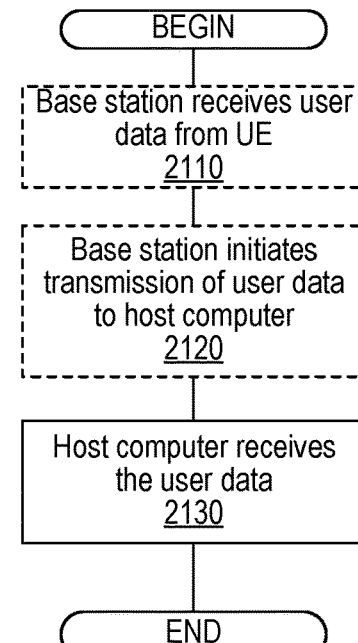
FIG. 19
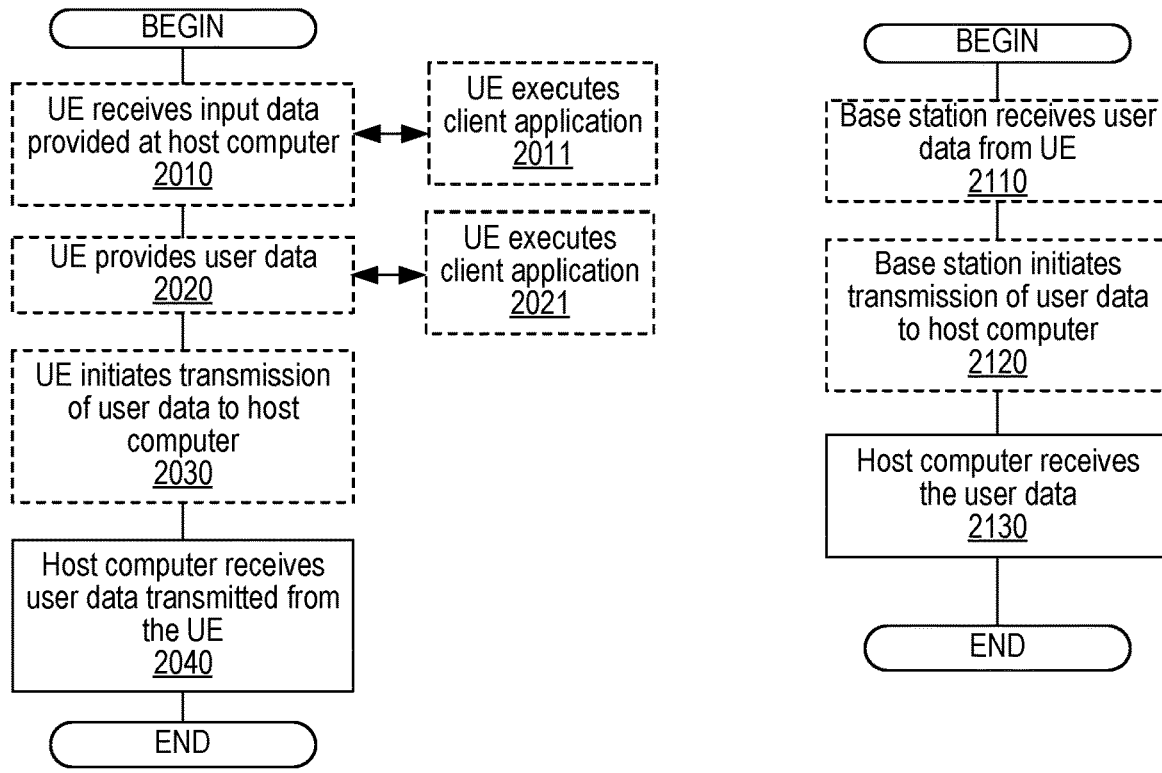
FIG. 20
FIG. 21

RECEIVER ASSISTED DIRECTIONAL CHANNEL SENSING FOR NR-U

TECHNICAL FIELD

Embodiments of the present disclosure generally relate to wireless communication networks, and particularly relate to performance improvements to operation of wireless devices (e.g., user equipment or UEs) in unlicensed spectrum.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases too. The present disclosure relates generally to NR, but the following description of previous-generation technology is provided for context since it shares many features with NR.

Long-Term Evolution (LTE) is an umbrella term for so-called fourth-generation (4G) radio access technologies developed within 3GPP and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two interface points, namely Uu (UE/E-UTRAN Radio Interface) and S1

(E-UTRAN/EPC interface), each using a specific set of protocols, i.e., Radio Protocols and S1 Protocols. Although not shown in FIG. 2A, each of the protocol sets can be further segmented into user plane (UP) and control plane (CP) protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast downlink (DL) data transmission, but also for transmission of RAR (random access response), certain system information blocks, and paging information. PHICH carries HARQ feedback (e.g., ACK/NAK) for uplink (UL) transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, hybrid ARQ (HARQ) feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of Ns, OFDM subcarriers. Exemplary values of $N^{DL}_{symb}$ can be 7 (with a normal CP) or 6 (with an extended-length CP) for subcarrier spacing (SCS) of 15 kHz. The value of Ns, is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

Logical channels reside between RLC and MAC layers in the LTE protocol stack. In general, logical channels are associated with a type of information being transferred. They can be broadly divided into control channels for the transfer of control plane information and traffic channels for the transfer of user plane information. Each logical channel is mapped to one or more transport channels, which are mapped to the physical channels discussed above.

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a pre-defined configuration. Such transmissions can be referred to as semi-persistent scheduling (SPS), configured grant (CG), or grant-free transmissions. In general, when referring to an UL transmission without an explicit grant as a "configured grant transmission," this term can include all types of pre-configured transmission patterns, including both SPS and grant-free operation.

While LTE was primarily designed for user-to-user communications, 5G/NR cellular networks are envisioned to support both high single-user data rates (e.g., 1 Gb/s) and large-scale, machine-to-machine (M2M) communication involving short, bursty transmissions from many different devices sharing a common spectrum. NR radio standards are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is a data service with extremely strict error and latency requirements, e.g., error probabilities as low as 10- or lower and 1 ms end-to-end latency or lower.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. NR also shares various other features of LTE that were discussed above.

In addition to providing coverage via "cells," as in previous generations, NR networks will also provide coverage via "beams." As used herein, "beam" refers to a coverage area of a reference signal that may be measured by a UE. In NR, for example, such reference signals can include any of the following, alone or in combination: SS/PBCH block (synchronization signal block, SSB), channel state information reference signal (CSI-RS), tertiary reference signals (or any other sync signal), positioning RS (PRS), demodulation RS (DMRS), etc.

NR targets operation in both licensed and unlicensed bands, and a work item named NR-based Access to Unlicensed Spectrum (NR-U) was started in January 2019. Allowing unlicensed networks (i.e., networks that operate in spectrum not licensed to the operator such that it must be shared) to effectively use available spectrum is an attractive approach to increase system capacity. Although unlicensed spectrum does not match the quality of licensed (e.g., unshared) spectrum, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations.

Before a UE transmits in unlicensed spectrum to a receiver (e.g., an eNB or next generation NodeB, gNB), it typically needs to perform a listen-before-talk (LBT) or a clear channel assessment (CCA). While such techniques have been used successfully in many scenarios, they may not function correctly in certain scenarios where the transmitter doesn't hear the same level of interference as the receiver. Accordingly, new techniques are needed for such scenarios.

According to IEEE 802.11 wireless networking protocol, a transmitting node may send out a request to send (RTS) packet to a receiving node when it wants to transmit data, and the receiving node replies a clear to send (CTS) packet. After the transmitting node receives the CTS packet, it transmits the data packet. The RTS/CTS frame is a broadcast and all the stations and access-points in the range who see this frame will keep quiet for a duration of time as specified by the Network Allocation Vector (NAV) field in the RTS to avoid collisions.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some exemplary embodiments include methods (e.g., procedures) for transmitting downlink (DL) data to a user equipment (UE) in unlicensed spectrum. These exemplary methods can be performed by a network node (e.g., base station, eNB, gNB, en-gNB, etc., or component thereof) in a wireless network (e.g., E-UTRAN, Next Generation RAN (NG-RAN)).

These exemplary methods can include transmitting a first short signal burst, to the UE, over a channel using a directional beam. The transmission can be responsive to DL data intended for the UE (e.g., received from a core network and indicated by the MAC layer that DL data intended for the UE needs to be transmitted). In some embodiments, the network node can refrain from sensing availability of the channel, via the directional beam, before transmitting the first short signal burst. These exemplary methods can also include, based on detecting a first response to the first short signal burst, from the UE, indicating that the channel is available, transmitting at least a portion of the DL data to the UE over the channel using the directional beam.

In some embodiments, the transmitting operations can include transmitting a first portion of the DL data. Such embodiments can also include transmitting a second short signal burst, to the UE, over the channel using the directional beam, and transmit a remaining portion of the DL data to the UE over the channel using the directional beam. Transmitting the remaining portion can be based on detecting a second response to the second short signal burst, from the UE, indicating that the channel is still available.

In some embodiments, the network node can determine whether an expected duration of a transmission of the DL data exceeds a predetermined threshold and/or the network node is in an interference-free environment, before transmitting the first short signal burst, when it is determined that the expected duration does not exceed the predetermined threshold and/or the environment is interference-free, transmitting the DL data to the UE without transmitting the first short signal burst.

In some embodiments, these exemplary methods can include various operations based on detecting a first response to the first short signal burst indicating that the channel is not available, detecting no response to the first short signal burst, and/or a channel status report included in the first response. In various embodiments, if one or more of these conditions are fulfilled, the various operations can include refraining from transmitting the DL data to the UE or transmitting the DL data to UE using a modulation and coding scheme (MCS) that best matches the reported channel status.

In some embodiments, these exemplary methods can include, responsive to DL data intended for one or more further UEs, transmitting short signal bursts, to the respective further UEs, over respective channels using respective directional beams in respective second directions. In such embodiments, the directional beam used in relation to the UE can be in a first direction, and at least one of the second directions is different than the first direction.

In some embodiments, the first short signal burst can include a first request, a second request, a first indication, a second indication, and/or a third indication, individually or in various combinations. Each of these can relate to various conditions, operations, resources, etc. associated with the first response. In some embodiments, the first short signal burst can also include one or more reference signals (RS) and/or a portion of the DL data.

In some embodiments, these exemplary methods can also include transmitting, to the UE, a higher-layer control (e.g., RRC) message that includes a configuration for the first request, the second request, the first indication, the second indication, and/or the third indication, individually or in various combinations. In general, the configuration for each of the various requests and indications can be transmitted to the UE in the higher-layer control message, with the first short signal burst, or using a combination thereof.

In some embodiments, the first response, from the UE, can include one or more of the following information: fast feedback regarding channel availability, a beam measurement report, a scheduling request, a buffer status report, and one or more channel measurements. The channel measurements can include any of the following: energy level for the channel, interference level for the channel, and signal-to-interference-and-noise ratio (SINR) for the channel.

Other exemplary embodiments include methods (e.g., procedures) for receiving downlink (DL) data via unlicensed spectrum from a network node in a wireless network. These exemplary methods can be performed by a user equipment (UE, e.g., wireless device, IoT device, modem, etc. or component thereof) in communication with a network node (e.g., base station, eNB, gNB, en-gNB, etc., or component thereof) in the wireless network (e.g., E-UTRAN, NG-RAN).

These exemplary methods can include receiving a first short signal burst, from the network node, over a channel using a directional beam. In some embodiments, these exemplary methods can also include, in response to receiving the first short signal burst, performing channel sensing to determine if the channel is available. These exemplary methods can also include transmitting a first response to the first short signal burst, to the network node, indicating whether the channel is available. In some embodiments, these exemplary methods can also include, in response to transmitting the first response indicating that the channel is available, receiving at least a portion of the DL data from the network node over the channel using the directional beam.

In some embodiments, the receiving operations can include receiving a first portion of the DL data. Such embodiments can also include receiving a second short signal burst, from the network node, over the channel using the directional beam; transmitting a second response to the second short signal burst, to the network node, indicating that the channel is still available; and, in response to transmitting the second response, receiving a remaining portion of the DL data from the network node over the channel using the directional beam.

In some embodiments, the first short signal burst can include a first request, a second request, a first indication, a second indication, and/or a third indication, individually or in various combinations. Each of these can relate to various conditions, operations, resources, etc. associated with the first response. In some embodiments, the first short signal burst can also include one or more reference signals (RS) and/or a portion of the DL data.

In some embodiments, these exemplary methods can also include receiving, from the network node, a higher-layer control (e.g., RRC) message that includes a configuration for the first request, the second request, the first indication, the second indication, and/or the third indication, individually or in various combinations. In general, the configuration for each of the various requests and indications can be received from the network node in the higher-layer control message, with the first short signal burst, or using a combination thereof.

In some embodiments, the first response can include one or more of the following information: fast feedback regarding channel availability, a beam measurement report, a scheduling request, a buffer status report, and one or more channel measurements. The channel measurements can include any of the following: energy level for the channel, interference level for the channel, and signal-to-interference-and-noise ratio (SINR) for the channel.

In some embodiments, these exemplary methods can also include determining whether one or more conditions are met and, when it is determined that the one or more conditions have not been met, refraining from transmitting the first response to the first short signal burst. In some embodiments, the UE can transmit the first response when it is determined that the one or more conditions have been met.

Other exemplary embodiments include methods (e.g., procedures) for receiving uplink (UL) data from a user equipment (UE) in unlicensed spectrum. These exemplary methods can be performed by a network node (e.g., base station, eNB, gNB, en-gNB, etc., or component thereof) in a wireless network (e.g., E-UTRAN, NG-RAN).

These exemplary methods can include determining availability of a channel, between the network node and the UE, using a directional beam. These exemplary methods can also include, based on determining that the channel is available, transmitting a first resource grant for transmission of the UL data by the UE. These exemplary methods can also include receiving the UL data from the UE over the channel using the directional beam.

In some embodiments, these exemplary methods can also include performing channel quality measurements for the channel and, based on the channel quality measurements, determining at least one of the following for inclusion in the first resource grant: time and frequency resources for transmission of the UL data; and a modulation and coding scheme (MCS) for transmission of the UL data.

In some embodiments, the first resource grant can be a configured grant of resources for a plurality of UL transmission opportunities for the UE. In such embodiments, these exemplary methods can also include, responsive to the configured grant, receiving a first short signal burst, from the UE, over the channel using the directional beam; performing channel sensing to determine if the channel is available; and transmitting a first response to the first short signal burst, to the UE, indicating whether the channel is available. In some embodiments, the first short signal burst can include a first request for the network node to perform sensing of the channel and send fast feedback regarding channel availability.

In some of the embodiments in which the first resource grant is a configured grant, the UL data can be received during a first one of the UL transmission opportunities. In such embodiments, the first response can also include downlink data for the UE and/or configuration information (e.g., MCS) related to one or more subsequent UL transmission opportunities.

In other embodiments, the first resource grant can be a dynamic grant of resources for a single UL transmission opportunity for the UE. In such embodiments, these exemplary methods can also include, in response to receiving the UL data, transmitting a second resource grant for transmission of further UL data by the UE. The second resource grant may comprise hybrid ARQ (HARQ) feedback for the UL data.

Other exemplary embodiments include methods (e.g., procedures) for transmitting uplink (UL) data via unlicensed spectrum to a network node in a wireless network. These exemplary methods can be performed by a user equipment (UE, e.g., wireless device, IoT device, modem, etc. or component thereof) in communication with a network node (e.g., base station, eNB, gNB, en-gNB, etc., or component thereof) in the wireless network (e.g., E-UTRAN, NG-RAN).

These exemplary methods may include receiving a first resource grant for transmission of UL data by the UE. These exemplary methods can also include, responsive to the resource grant, transmitting a first short signal burst, to the network node, over a channel using a directional beam. In some embodiments, the first short signal burst can include a first request for the network node to perform sensing of the channel and send fast feedback regarding channel availability. These exemplary methods can also include, based on detecting a first response to the first short signal burst, from the network node, indicating that the channel is available, transmitting at least a portion of the UL data to the network node over the channel using the directional beam.

In some embodiments, the first resource grant can be a configured grant of resources for a plurality of UL transmission opportunities for the UE. In some of these embodiments, the UL data can be transmitted during a first one of the UL transmission opportunities, and the first response can include downlink data for the UE and/or configuration information (e.g., MCS) related to one or more subsequent UL transmission opportunities.

In some embodiments, these exemplary methods can also include performing various operations based on detecting a first response to the first short signal burst indicating that the channel is not available, or detecting a first response to the first short signal burst indicating that different frequency resource and/or different modulation and coding scheme (MCS) is to be used for transmitting the UL data, or detecting no response to the first short signal burst from the network node. In various embodiments, if one or more of these conditions are fulfilled, the various operations can include refraining from transmitting the UL data to the network node or transmitting the UL data to network node using the indicated frequency resource and/or MCS.

Other exemplary embodiments include user equipment (UEs, e.g., wireless devices, IoT devices, or components thereof, such as a modem) and network nodes (e.g., base stations, eNBs, gNBs, en-gNBs, etc., or components thereof) configured to perform operations corresponding to any of the exemplary methods described herein. Other exemplary embodiments include non-transitory, computer-readable media storing program instructions that, when executed by processing circuitry, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIGS. 18-21 are flow diagrams of exemplary methods (e.g., procedures) for transmission and/or reception of user data (e.g., for an OTT data service), according to various exemplary embodiments of the present disclosure.

DETAILED DESCRIPTION

Figure 1:
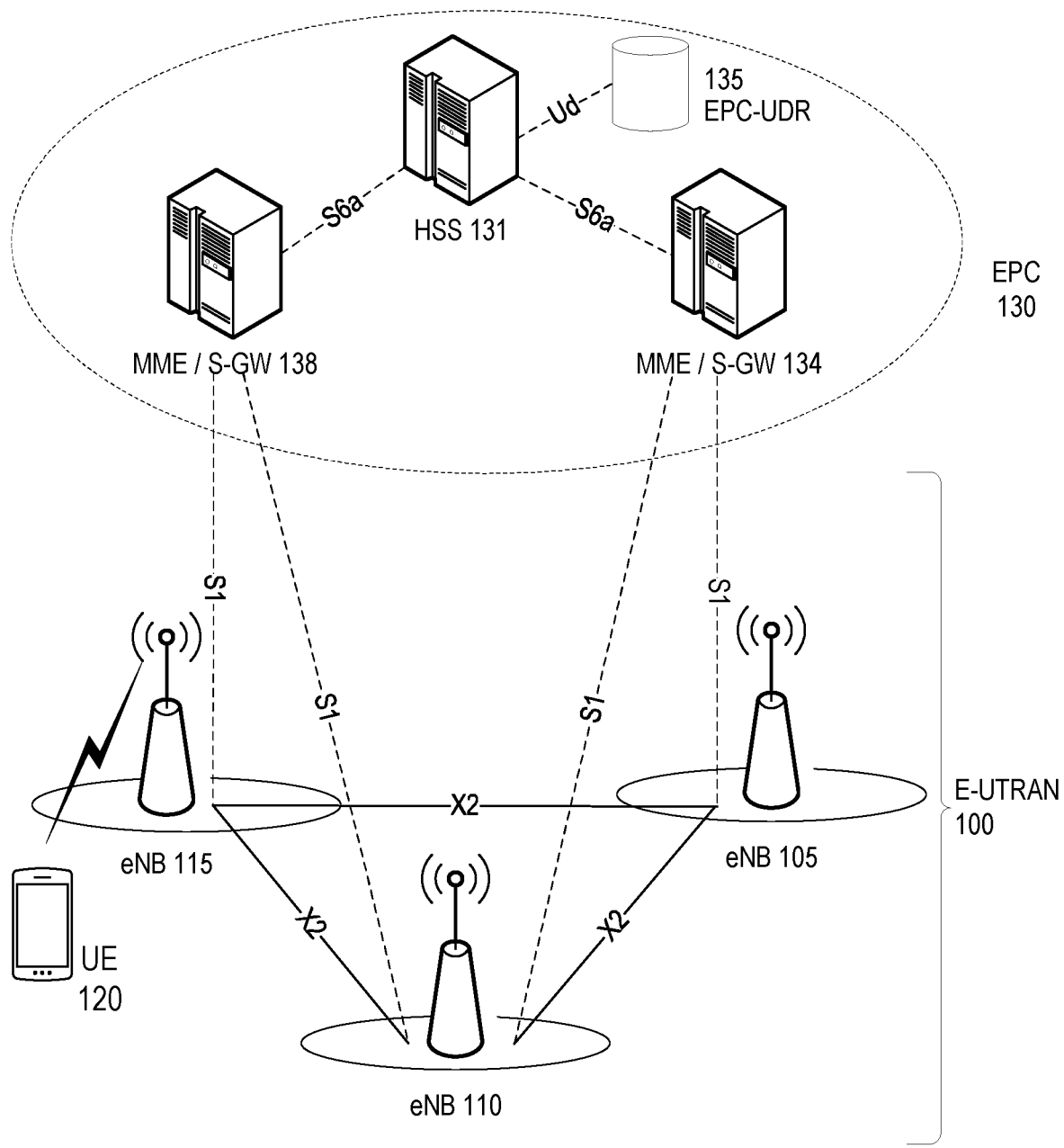
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
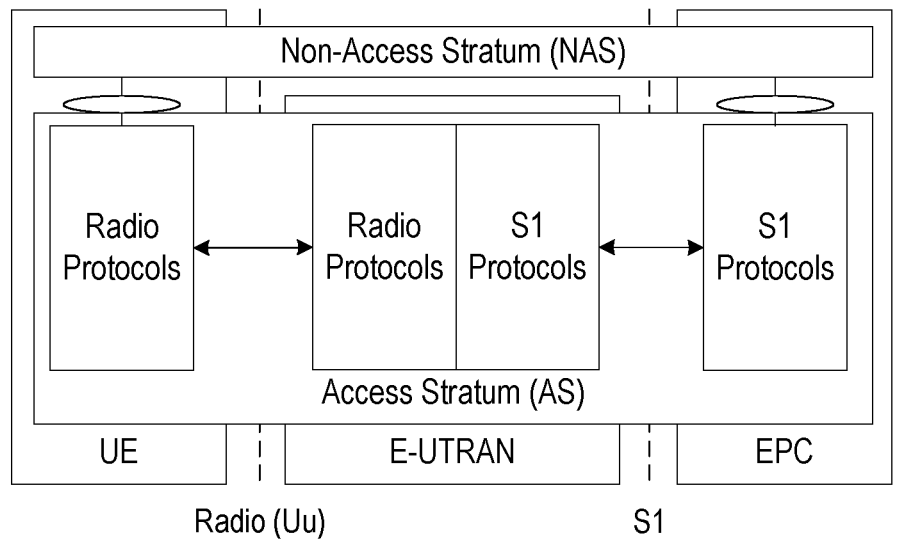
FIG. 2A is a high-level block diagram of an exemplary E-UTRAN architecture in terms of its constituent components, protocols, and interfaces.
Figure 2B:
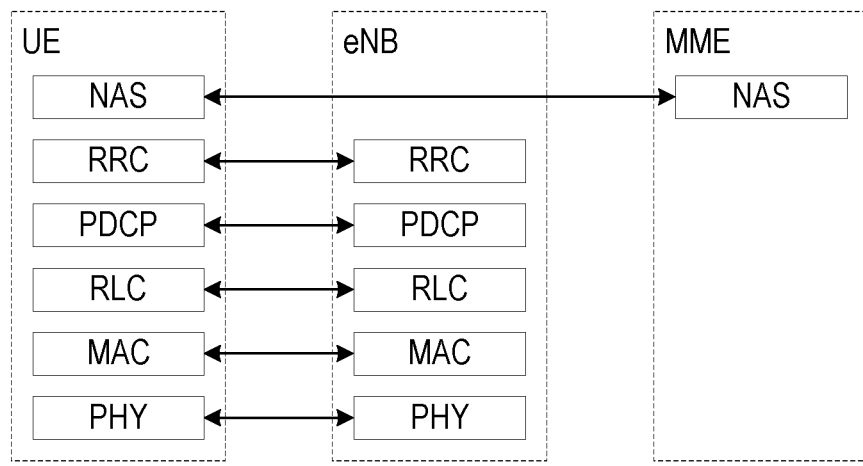
FIG. 2B is a block diagram of exemplary protocol layers of the control-plane portion of the radio (Uu) interface between a user equipment (UE) and the E-UTRAN.
Figure 2C:
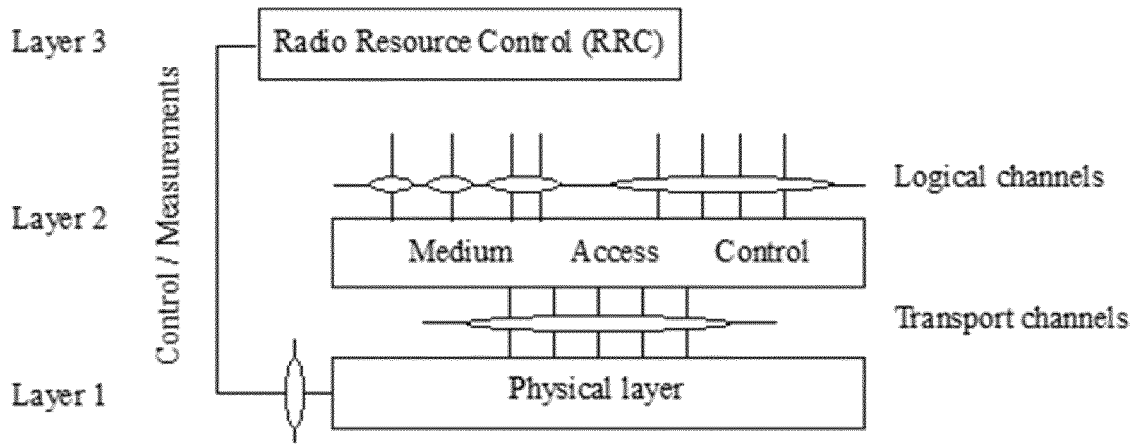
FIG. 2C is a block diagram of an exemplary LTE radio interface protocol architecture from the perspective of the PHY layer.
Figure 3A:
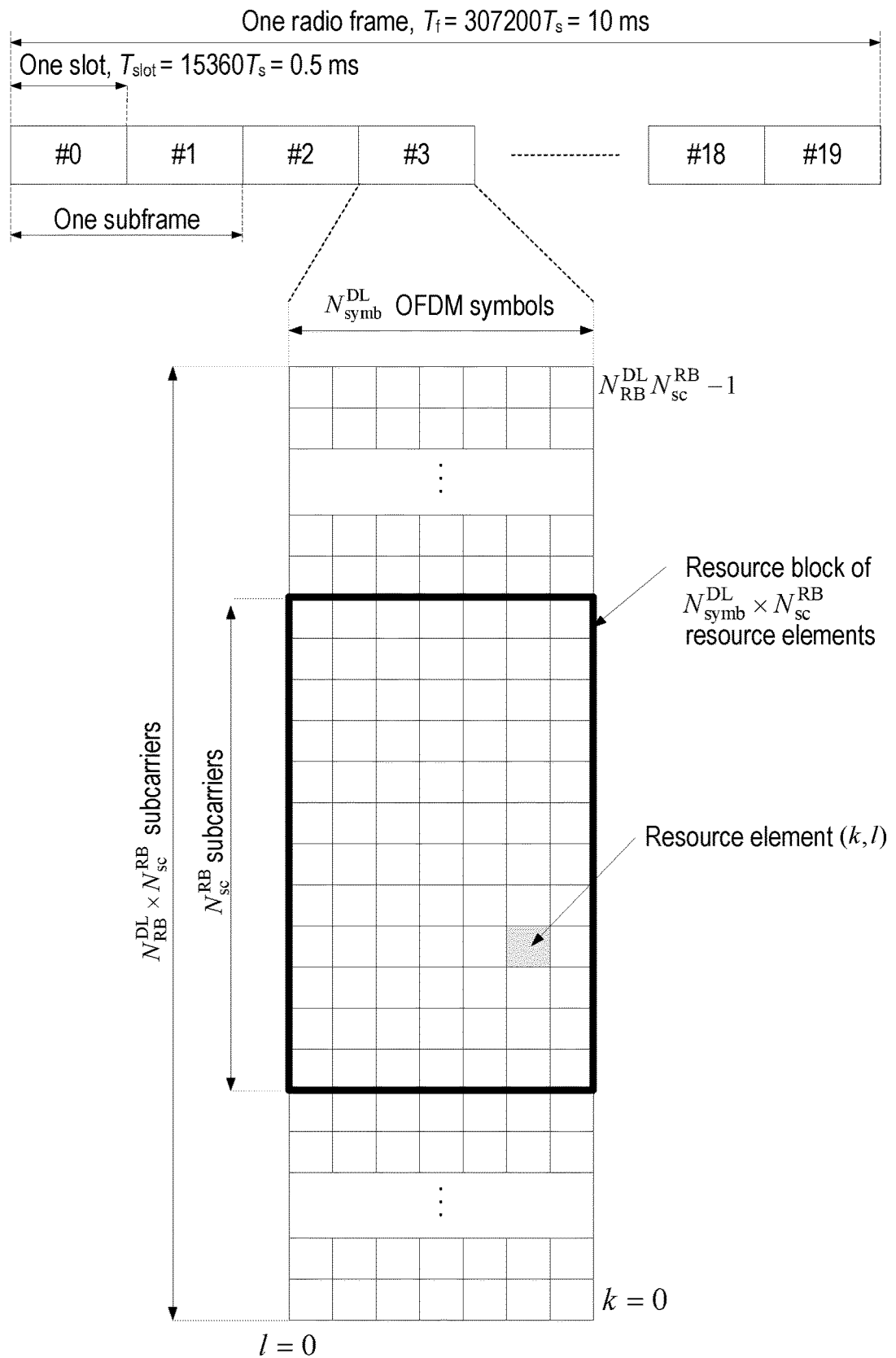
FIGS. 3A and 3B are block diagrams, respectively, of exemplary downlink and uplink LTE radio frame structures used for frequency division duplexing (FDD) operation.
Figure 3B:
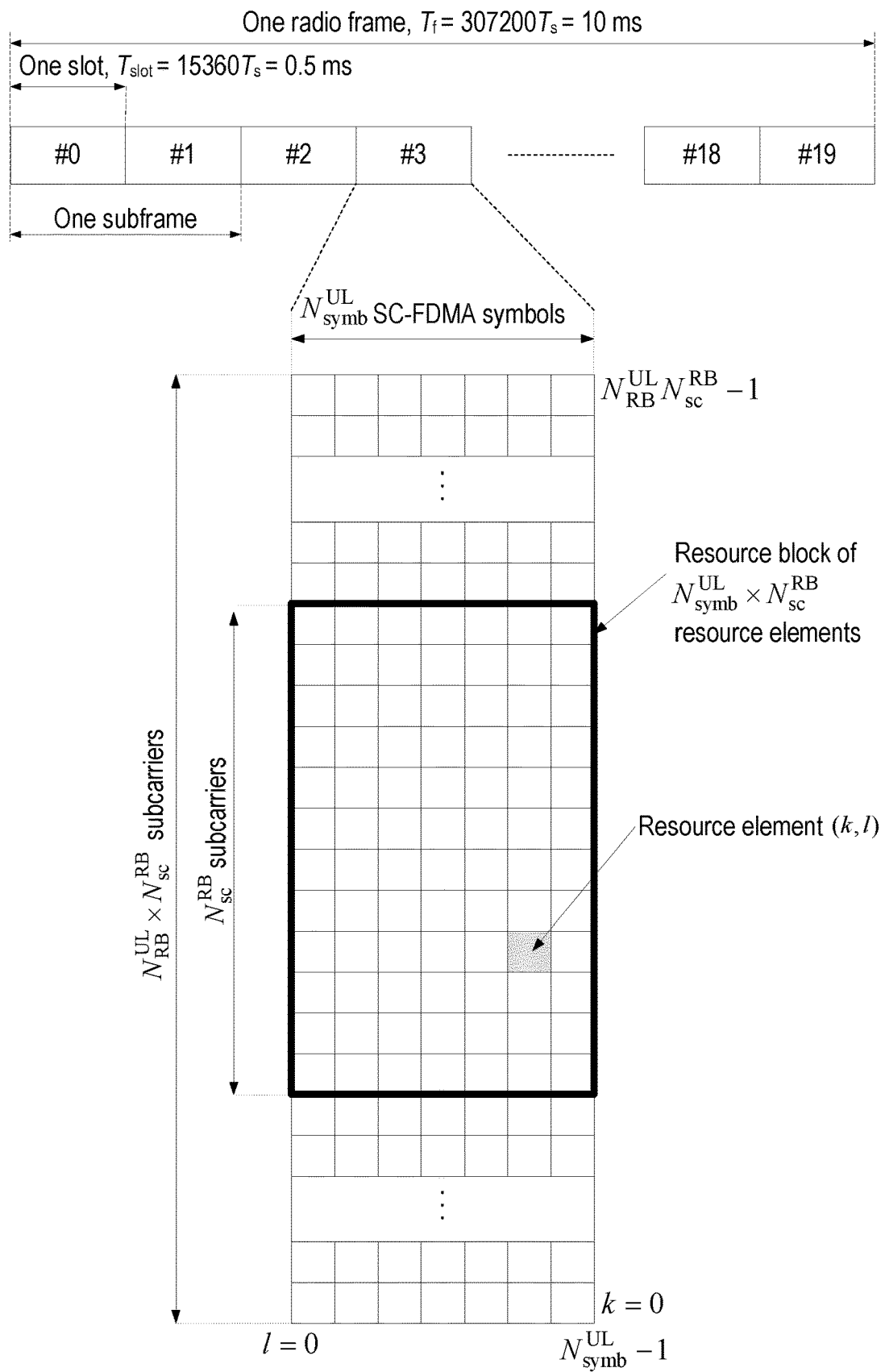

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, Narrowband IoT (NB-IOT) devices, aerial devices (e.g., drones), D2D UEs, ProSe UEs, V2V UEs, V2X UEs, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, before a UE transmits in unlicensed spectrum to a receiver (e.g., an eNB or gNB), it typically needs to perform a listen-before-talk (LBT) or a clear channel assessment (CCA). While such techniques have been used successfully in many scenarios, they may not function correctly in certain scenarios where the transmitter doesn't hear the same level of interference as the receiver. Such scenarios often involve large path losses at higher frequencies as well as directional transmission and reception, e.g., via directional beams generated from antenna arrays. These conditions are expected to be present in deployments of NR networks, especially for NR-U operation for instance in high frequency (e.g. millimeter wave) bands. These issues are discussed in more detail below, after the following explanation of NR technology.

Mobile broadband is expected to drive the demands for higher overall traffic capacity and higher achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments. This infra-structure density is considerably higher than even the most-dense networks of today. The wide transmission bandwidths needed to provide data rates up to 10 Gbps and above can likely only be obtained from spectrum allocations in the millimeter-wave (mmW) band, e.g., from 6 GHz to around 60 GHz. High-gain beamforming, typically realized with array antennas, can be used to mitigate the increased pathloss at these higher frequencies. Such techniques are expected to be used in deployments of NR networks that use mmW spectrum.

In Rel-15 NR, a UE can be configured with up to four carrier bandwidth parts (BWPs) in the downlink (DL) with a single DL carrier BWP being active at a given time. A BWP consists of a group of contiguous PRBs, and a bandwidth of a BWP is equal to or is smaller than the maximal bandwidth capability supported by a UE. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

NR also supports flexible bandwidth configurations for different UEs on the same serving cell. In addition, the bandwidth monitored by a UE and used for its control channels (e.g., PDCCH) and data channels (e.g., PDSCH) may be smaller than the carrier bandwidth. Reserved resources can be configured within a BWP.

Figure 4:
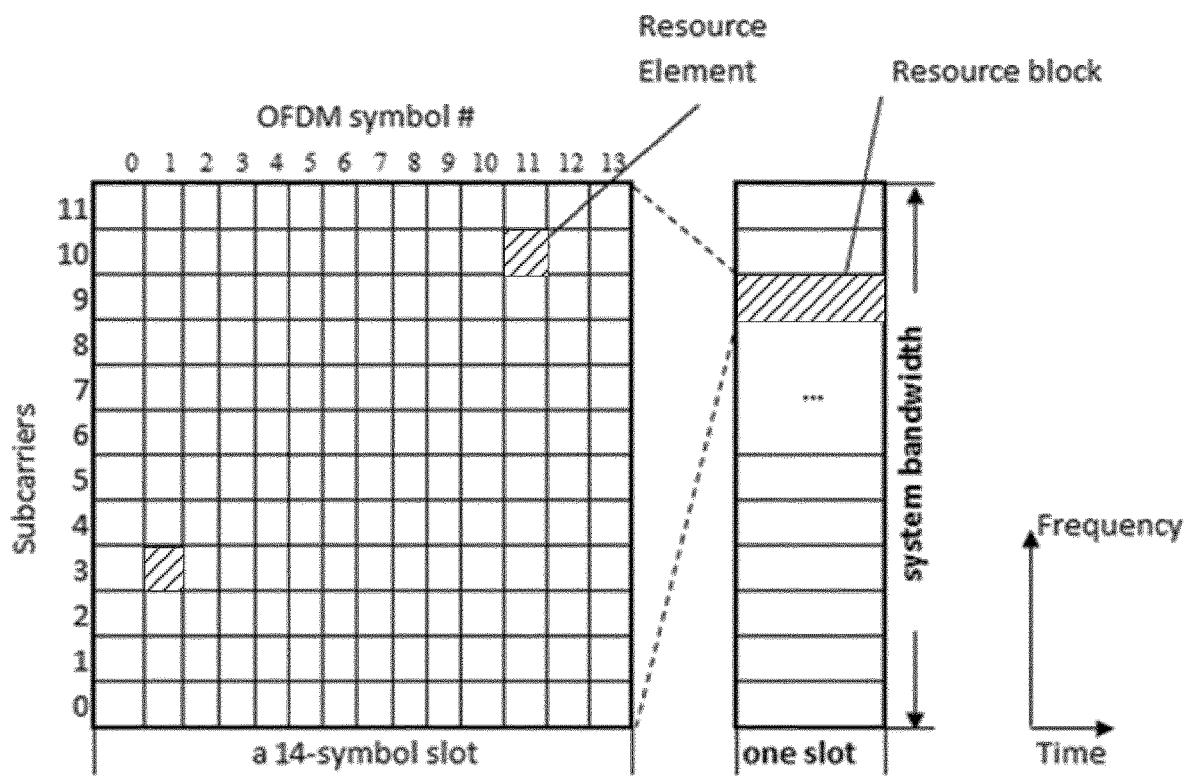
FIG. 4 shows an exemplary time-frequency resource grid for a New Radio (NR) slot.

FIG. 4 shows an exemplary time-frequency resource grid for an NR slot. As illustrated in FIG. 4, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2)$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The slot length is inversely related to SCS or numerology according to $\frac{1}{2^\mu}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu * 180$ kHz.

Table 1 below summarizes the supported NR numerologies and associated parameters. Different DL and UL numerologies can be configured by the network.

TABLE 1

| $\mu$ | $\Delta f = 2^\mu \cdot 15$ [kHz] | Cyclic prefix | Slot length | RB BW (MHz) |
| --- | --- | --- | --- | --- |
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 5A:
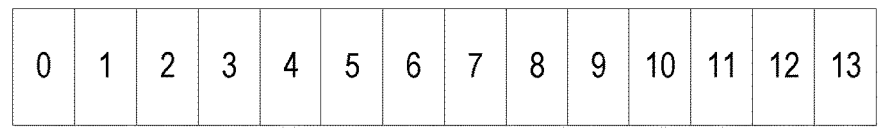
FIGS. 5A-5B shows various exemplary NR slot configurations.

An NR slot can include 14 OFDM symbols for normal cyclic prefix and 12 symbols for extended cyclic prefix. FIG. 5A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 5B:
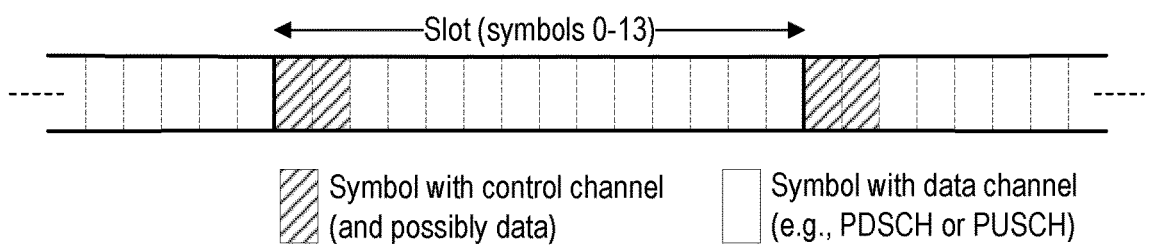

FIG. 5B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 5B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in an RB, whereas an LTE REG includes only four REs. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2.

In addition to dynamic scheduling on a per-slot basis, discussed above, NR also supports semi-persistent scheduling in the DL. In this approach, the network configures a periodicity of PDSCH transmission via RRC and then controls the start and stop of transmissions via DCI in PDCCH. One advantage of this technique is reduction of control signaling overhead on PDCCH. NR also supports a similar feature on the UL, referred to as configured grants (CG). In general, CG type 2 is similar to DL semi-persistent scheduling in downlink (e.g., RRC plus DCI) while CG type 1 is controlled by only RRC, including the start and stop of transmissions.

Figure 6:
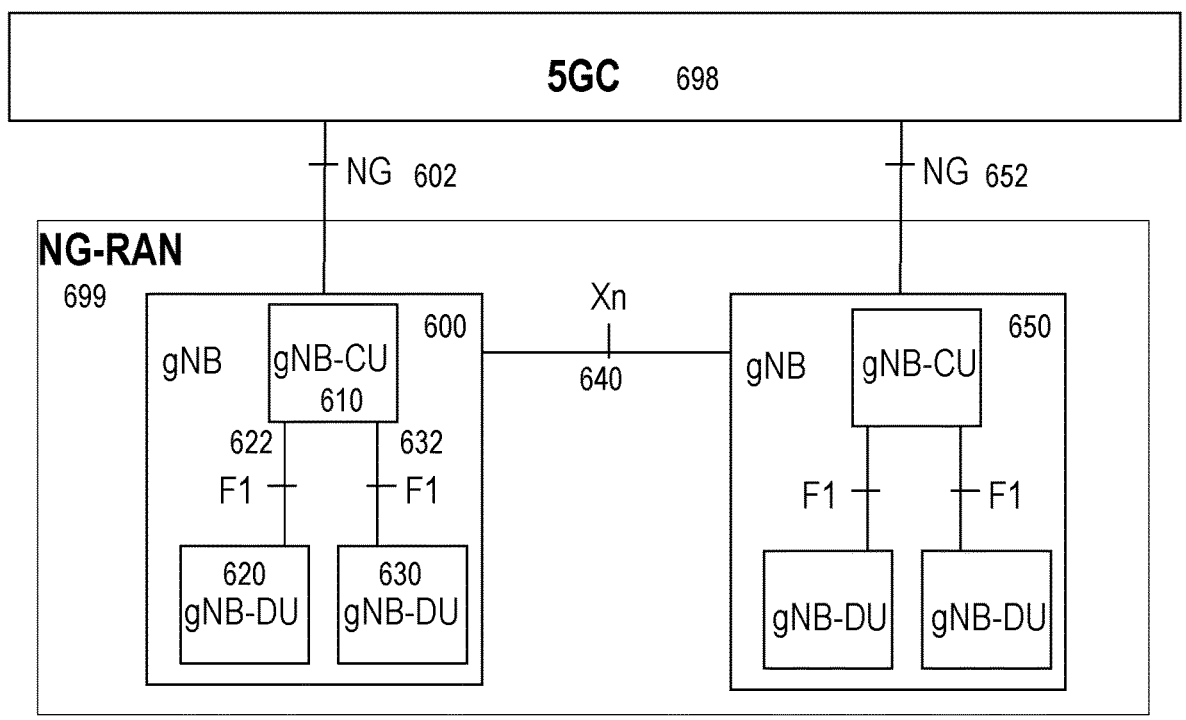
FIG. 6 illustrates a high-level view of a 5G network architecture.

FIG. 6 illustrates a high-level view of the 5G network architecture, consisting of a Next Generation RAN (NG-RAN) 699 and a 5G Core (5GC) 698. NG-RAN 699 can include a set of gNodeB's (gNBs) connected to the 5GC via one or more NG interfaces, such as gNBs 600, 650 connected via interfaces 602, 652, respectively. In addition, the gNBs can be connected to each other via one or more Xn interfaces, such as Xn interface 640 between gNBs 600 and 650. With respect to the NR interface to UEs, each of the gNBs can support frequency division duplexing (FDD), time division duplexing (TDD), or a combination thereof.

The NG RAN logical nodes shown in FIG. 6 (and described in 3GPP TS 38.401 and 3GPP TR 38.801) include a central (or centralized) unit (CU or gNB-CU) and one or more distributed (or decentralized) units (DU or gNB-DU). For example, gNB 600 in FIG. 6 includes gNB-CU 610 and gNB-DUs 620 and 630. CUs (e.g., gNB-CU 610) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 622 and 632 shown in FIG. 6. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 7:
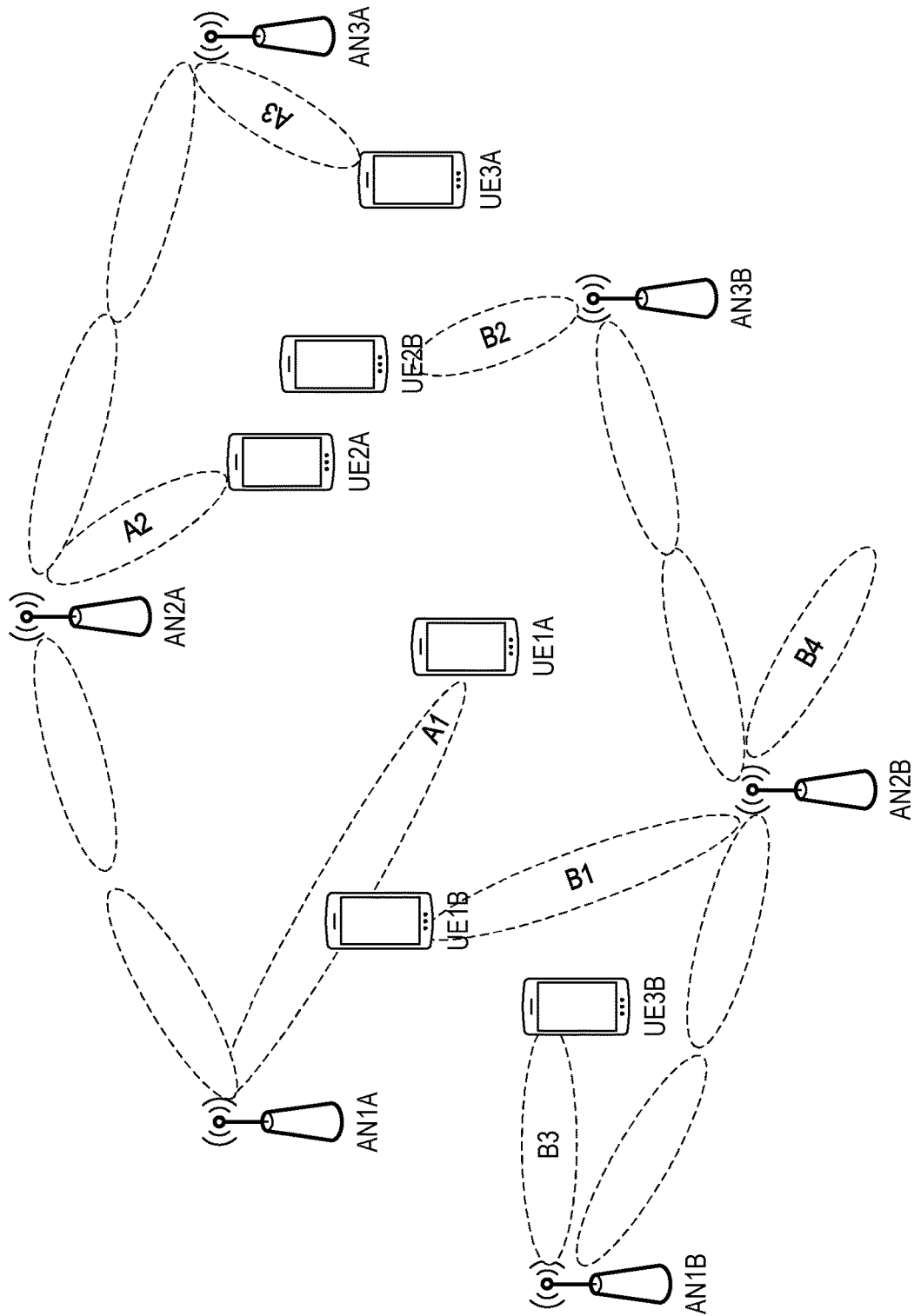
FIG. 7 shows an exemplary scenario illustrating a need for spectrum coexistence techniques.

Besides traditional used in licensed (i.e., exclusive) spectrum, NR systems are also expected to be operating on unlicensed bands in shared spectrum, especially for enterprise solutions. NR operation in unlicensed bands is referred to generally as NR-U. Coexistence techniques are needed in these deployments to enable spectrum sharing between different operators or other systems. FIG. 7 shows an exemplary scenario in which spectrum coexistence techniques are desirable and/or necessary. In the scenario shown in FIG. 7, network "A" and network "B" are located in the same geographic area and share the same frequency spectrum, but are controlled by different entities (e.g., operators or companies). In this scenario, any coexistence techniques are preferably distributed so that there is no need to exchange information between different networks or controlling entities, which would create significant complexities.

According to a common coexistence technique, for a node (e.g., UE or eNB) to be allowed to transmit in unlicensed spectrum, it typically needs to perform a listen-before-talk (LBT) or a clear channel assessment (CCA). For example, in the 5 GHz band, the sensing is done over 20-MHz channels. In general, the MAC layer initiates a transmission and requests the PHY layer to initiate the LBT procedure. After completion, the PHY layer indicates the LBT outcome (e.g., success or failure). This procedure can include sensing the medium as idle for a number of time intervals, which can be done in various ways including energy detection, preamble detection, or virtual carrier sensing.

In virtual carrier sensing, the node reads control information from other transmitting nodes informing when a transmission ends. After sensing the medium idle, a node is typically allowed to transmit for a certain amount of time, referred to as transmission opportunity (TXOP). The length of the TXOP depends on regulation and type of CCA that has been performed, but typically ranges from 1 ms to 10 ms.

Figure 8:
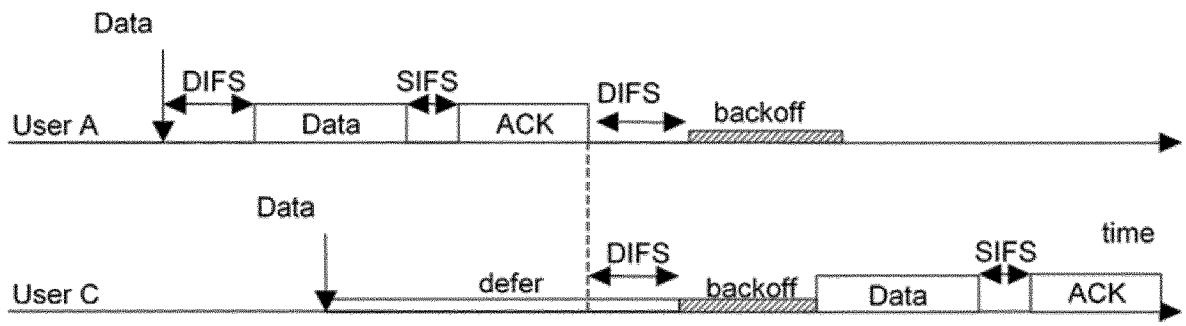
FIG. 8 shows an exemplary listen-before-talk (LBT) mechanism for wireless LANs.

FIG. 8 shows an exemplary LBT mechanism for wireless LANs (WLANs), as specified in IEEE 802.11. As shown in FIG. 8, IEEE 802.11 WLANs employ a Carrier Sense Multiple Access with Collision Avoidance (CSMA/CA)-based MAC layer. The same protocol is applied by all stations including the access point (AP), i.e., in both downlink and uplink. A station that wishes to transmit a packet first senses the medium. If the medium is sensed idle for a certain minimum time, a so-called Distributed Inter Frame Space (DIFS, 50 μs for IEEE 802.11b), the packet is transmitted.

If the medium is busy, the station first defers until the medium is sensed idle. When this occurs, the station does not transmit immediately, which would lead to collisions if more than one station was deferring. Instead, the station sets a backoff timer to a random number and does not transmit until this timer has expired. The backoff timer is only decreased when the medium is sensed idle, whereas whenever the medium is sensed busy, a deferral state is entered where the backoff timer is not decreased. When the backoff timer expires, the packet is transmitted. If the packet is successfully received, the receiver responds with an acknowledgement to the transmitter. The acknowledgement is sent a Short Inter Frame Space (SIFS, 10 μs for IEEE 802.11b) after the data frame is received. Since SIFS<DIFS, no other user will access the medium during this time.

If no acknowledgement is received, either because the packet or the acknowledgement was lost, the transmitter generates a new backoff, and retransmits the packet when the backoff timer has expired. Even if the packet was successfully acknowledged, the transmitter must generate a backoff and wait for it to expire before transmitting the next packet. To avoid congestion, when collisions occur, backoff values are drawn from distributions with larger and larger expectations for every retransmission attempt. The backoff time is measured in units of slot times, which for 802.11b are 20 μs long.

In general, both listening and transmitting in 802.11 systems are performed omnidirectionally, such that an LBT procedure detects interference that originates in any direction. Since 802.11 networks operate in spectrum at 2.4 GHz and 5 GHz, both of which are below mmW frequencies, this technique has been successful in avoiding interference between simultaneous transmissions on the same medium.

However, as operating frequencies of wireless networks move to mmW spectrum, data transmission between nodes suffers from much higher propagation loss, which is generally proportional to the square of the carrier frequency. Moreover, mmW signals also suffer from high penetration loss (e.g., through solid barriers) and a variety of blockage problems. On the other hand, with the wavelengths on the order of 1 cm, it becomes possible to pack an antenna array with a large number of antenna elements into a compact form or package, which can facilitate wide adoption in both access points and user devices (e.g., UEs). Such antenna arrays can generate narrow beams with large directional beam-forming gains that can compensate for the high path loss in mmW spectrum, as well as rejecting interference that originates from directions outside of the narrow beam. Accordingly, it is expected that highly directional beams will be used in NR-U deployments in mmW spectrum.

As discussed above, in conventional LBT operation, the transmitter is responsible for channel sensing before initiating transmission. For example, the transmitter can initiate transmission of a packet only if the channel is sensed idle for a certain amount of time. This technique is based on the assumption that the interference level at the intended receiver is similar to the energy level detected by the transmitter (i.e., proximate to the transmitter's antenna). However, this assumption is not always valid in mmW bands where the transmitter doesn't always hear the same level of interference as the receiver. This is mainly due to the various factors discussed above, including the large path loss, blockage issues, and directional transmission/reception patterns based on use of antenna arrays with large numbers of antenna elements.

For example, when the transmitter is unable to hear a potential interferer proximate to the receiver during LBT, it will decide to transmit a data packet to the receiver. At the receiver, however, this data packet will collide with the transmissions of the interferer, and likely will be lost. This scenario is referred to as "the hidden node problems." As another example, the transmitter detects an interfering transmission during LBT and refrains from transmitting the data packet. However, the interfere is distant enough from the intended receiver that it would not have affected the reception of the data packet, if the packet were actually transmitted by the transmitter. This scenario is referred to as "the exposed node problem". Both hidden node and exposed node problems become more severe in unlicensed mmW spectrum due to large path loss, blockage issues, and directional transmission/reception patterns discussed above.

Accordingly, exemplary embodiments of the present disclosure mitigate, reduce, and/or eliminate these and other exemplary problems, issues, and/or drawbacks by providing a flexible mechanism for channel sensing in unlicensed spectrum in high frequency (e.g., mmW) bands. In contrast to the classical LBT where channel sensing is carried out by the transmitter, the proposed mechanism involves channel sensing by the receiver, so as to obtain more accurate channel status for channel access. The invention proposes a fast feedback request and report mechanism in the context of NR-U technology. The concept can also be applied to other technologies that operate in unlicensed mmW spectrum.

These exemplary embodiments can provide various exemplary advantages and/or benefits when employed in UEs and wireless networks. For example, such embodiments can improve channel sensing accuracy for channel access by involving channel sensing in the receiver. As another example, such embodiments facilitate fast channel adaptivity by introducing a fast feedback mechanism. Based on these and other exemplary advantages, exemplary embodiments can improve spectrum efficiency and overall system capacity in unlicensed spectrum in high frequency bands. Furthermore, such embodiments can be complementary and/or compatible with existing solutions, thereby minimizing impacts and/or changes to relevant standards specifications (e.g., by 3GPP and/or IEEE). Accordingly, due to these and other exemplary advantages, the disclosed embodiments can facilitate increased usage of unlicensed spectrum (e.g., by NR-U systems), which can be important for addressing the growing need for mobile broadband data.

At a high level, disclosed embodiments involve a receiver-assisted directional channel sensing mechanism to mitigate the hidden node and/or the exposed node problems encountered in channel access in unlicensed spectrum, especially in high frequency bands (e.g., mmW spectrum above 52.6 GHz). In contrast to the classical LBT mechanism where the transmitter performs channel sensing before data transmission starts, in the disclosed embodiments, an intended receiver of a data transmission session performs channel sensing and reports the result (e.g., channel availability) to a transmitter, controller, and/or scheduler. Based on the reported results of the channel sensing from the intended receiver, the transmitter, controller, and/or scheduler determines whether the data transmission should be executed immediately or be deferred.

At a high level, embodiments can be grouped into embodiments related to transmission of DL data (e.g., from a network node to a UE, referred to as "first group") and embodiments related to transmission of UL data (e.g., from a UE to a network node, referred to as a "second group").

Figure 9:
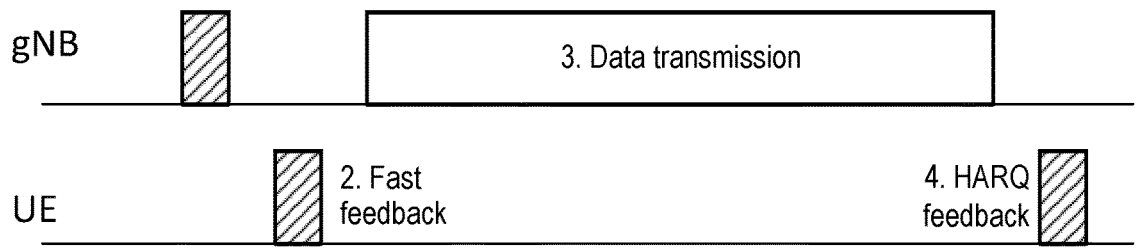
FIG. 9 shows an exemplary downlink (DL) data transmission scenario that illustrates, at a high level, a first group of embodiments of the present disclosure.

FIG. 9 shows an exemplary DL data transmission scenario that illustrates, at a high level, the first group of embodiments. The illustrated scenario involves a transmitter (e.g., gNB operating according to NR-U) that has one or more user data packets (also called Transport Blocks, or TBs) for DL transmission to an intended receiver (e.g., a UE). For example, the gNB may have received the DL data from a function in a core network (e.g., user plane function (UPF) in 5GC).

In the embodiments illustrated by FIG. 9, the gNB starts a DL transmission session by transmitting a short burst to the intended UE directly (e.g., with or without performing channel sensing). When the transmission is with a directional beam, it is preferable to transmit without LBT to reduce unnecessary delay. The short burst includes a L1 control signaling (e.g., a Fast Feedback Request) to dynamically request channel sensing, measurement, and/or fast feedback from the UE. The Fast Feedback Request can be included either in a new DCI format, or in an extension of an existing legacy DCI format. In addition, relevant configuration can be provided to the UE by higher-layer control message (e.g., RRC) at some time before the short burst, such as when a connection is established.

The Fast Feedback Request can indicate in which time and frequency resource the fast feedback should be transmitted in the UL, which can involve indexing to a pre-configured resource allocation table. The fast feedback resource can, for example, be a PUCCH resource where the resource starts at a configurable offset relative to the time when the DCI was received.

For example, the startingSymbolIndex in the legacy PUCCH resource configuration can be indicated as an offset (e.g. in OFDM symbols) relative to symbol where the DCI was received, instead of being a fixed symbol number in a slot according to conventional implementations.

The Fast Feedback Request or the relevant higher-layer configuration can optionally indicate what types of feedback information (e.g., signal energy, interference level, SINR, etc.) that the gNB expects the UE to report. The Fast Feedback or the relevant higher-layer configuration can optionally indicate for the UE to report some other information in the fast feedback that can benefit the overall operation, such as a beam Measurement report, a scheduling request, a buffer status report, etc.

The Fast Feedback Request field enables the gNB to dynamically request fast feedback from UE. For example, the gNB can determine whether or not to request a fast feedback from the UE based on the frequency band, network deployment, interference level, channel sensing method, expected transmission duration, transport block size, historical statistics, etc.

In one example, gNB may request fast feedback from UE only for long data transmission cases (e.g., a contiguous transmission time spanning more than N slots). In such cases, gNB may indicate UE to report fast feedback in the first slots, and perhaps in some later slot(s) for purpose of COT extension. For short transmission bursts, it is less meaningful for gNB to request fast feedback from the UE. In this case channel adaptation can be achieved by HARQ retransmission with random back-off. Accordingly, the gNB can determine whether or not to request fast feedback based on the expected transmission time of the available DL data.

The presence of the Fast Feedback Request field in DCI can be configurable by higher layers. In some embodiments, the UE can be configured by higher-layer signaling (e.g., via system information broadcasting or unicast) to always transmit or do not transmit fast feedback. For example, in an interference-free environment (e.g., no other networks in close vicinity using the same spectrum), the gNB may configure UEs to disable the fast feedback mechanism.

As another example, the UE can also be configured with a trigger quantity and condition when to transmit the fast feedback. If the trigger condition is fulfilled, the UE transmits the Fast Feedback; otherwise it does not transmit the Fast Feedback. The trigger quantity can, for example, be an absolute threshold, such as an absolute power level, an absolute signal-to-noise-and-interference ratio (SINR), etc. The trigger condition can also be a relative threshold, e.g., based on a reference value. When the trigger condition is a relative threshold, the reference value can be indicated in the Fast Feedback Request (e.g., in the DL DCI). For example, the reference value can be indicated directly (e.g., by a value) or it can be indicated indirectly by an index to an entry in a table of values. The table can be provided to the UE via higher-layer signaling (e.g., RRC).

In general, the short burst can include one or more of the following:
L1 control signaling (Fast Feedback Request) in PDCCH to request channel sensing and fast feedback from the targeting UE;
Demodulation and decoding parameters for the DL data, such as modulation and coding scheme (MCS);
Reference signals such as CSI-RS, CSI-IM, to assist the UE in channel sensing and measurement; and/or
At least a portion of the DL data.
The size of the short burst can be configurable based on which of the above are included, as well as the sizes of the respective components.

In some embodiments, upon detection of the short burst and identifying that fast feedback is requested by the gNB, the UE can perform channel sensing. The UE's channel sensing could be omni-directional or directional in the direction towards the gNB. In some embodiments, the UE may not need to perform channel sensing but only channel measurement and PDCCH decoding. If the channel condition is favorable (according to the conditions received from the gNB), the UE responds to the gNB with fast feedback. Otherwise the UE does not transmit the fast feedback. The fast feedback can be transmitted using assigned UL time and frequency resources, e.g., as indicated by a field in the Fast Feedback Request.

If requested by the gNB, the UE can measure the channel and the short burst to generate a channel status report. As indicated in the Fast Feedback Request field (or by higher layer signaling), the channel status report may include signal level, interference level, SINR, etc. The UE can determine whether the current channel condition is favorable for continuation of the data transmission session or not, based on one or multiple measurement quantities.

In some embodiments, the UE can always report the channel status to the gNB in the fast feedback and let the gNB draw the conclusion on the channel condition and make the decision on the data transmission. In some embodiments, UE can include other beneficial information in the fast feedback upon request by the gNB, such as beam measurement report, scheduling request, buffer status report, etc.

If DL data is included in the short burst (e.g., with the fast feedback request), depending on the UE's processing delay, the UE may include an ACK/NACK for this DL data with the fast feedback, or it may transmit the ACK/NACK later.

In some embodiments, when the gNB receives the fast feedback, from the UE, indicating the channel is available for data transmission, the gNB can transmit one or more TBs of the DL data to the UE. For example, the gNB can transmit the TBs in a conventional manner on PDSCH.

In some embodiments, demodulation and decoding parameters for PDSCH carrying the DL data can be included with the short burst transmitted to the UE. The gNB can transmit the TBs according to these earlier-provided parameters.

Otherwise, if the gNB doesn't receive any response from the UE in a designated time and frequency resource, the gNB should consider the channel as being unavailable (e.g., blocked) and should defer the data transmission session until a later point in time.

In some embodiments, the UE can always respond to the gNB with a fast feedback report which includes the channel measurement results and any other information as requested by the gNB. The gNB is responsible for drawing conclusions on the channel assessment on the receiver side and making a scheduling decision for the DL data transmission. In some embodiments, the gNB can adapt the transmission scheme (e.g., MCS, transmit power, etc.) used for the DL data based on the measurement report from UE. For example, this can be done when the gNB has sufficient processing time between the fast feedback and the subsequent DL data transmission.

In some embodiments, when all TBs of the DL data have been received and decoded, the UE can transmit a HARQ feedback to the gNB to confirm the success or failure of the data transmission session.

Some of these embodiments can be implemented with minimum specification impact, using the same signaling as in NR Rel-16. For example, the gNB can transmit only a short DL burst and trigger CSI report or SRS transmissions shortly after the short DL burst using the existing aperiodic CSI reporting mechanism. The gNB then has to wait for the CSI report or SRS transmissions before continuing with the remaining DL transmissions.

Although the above embodiments were discussed in the general context of NR-U, the fast feedback request and fast feedback could be transmitted in licensed and/or unlicensed spectrum, which can be configured by gNB.

As an example to illustrate certain embodiments, a relative SINR trigger condition can be configured, such that the UE transmits the Fast Feedback only if the SINR measured by the UE is higher than a reference value. The gNB signals a reference value that is a few dB lower than the SINR corresponding to an MCS that the gNB has selected for DL data transmission.

Alternately, the reference SINR value can be derived from an SINR corresponding to the used MCS value for the short DL burst and a pre-configured SINR offset. As such, the UE transmits the Fast Feedback if the SINR measured at the UE is at least as good as what the gNB expected. In case the UE is subject to interference the gNB did not detect, the SINR measured at the UE will be lower than the reference value and the Fast Feedback will not be transmitted. Accordingly, the gNB will determine that the UE is subject to interference from a "hidden node." Depending on processing capabilities, the gNB can either abandon the upcoming DL transmissions or adapt the MCS, if the SINR reported by the Fast Feedback is deemed high enough. One benefit with a conditional Fast Feedback is that if the UE is subject to heavy interference, it is beneficial for the interfering node that the UE refrains from transmitting the Fast Feedback—especially since the gNB will decide not to transmit even if receives the feedback.

Figure 10A:
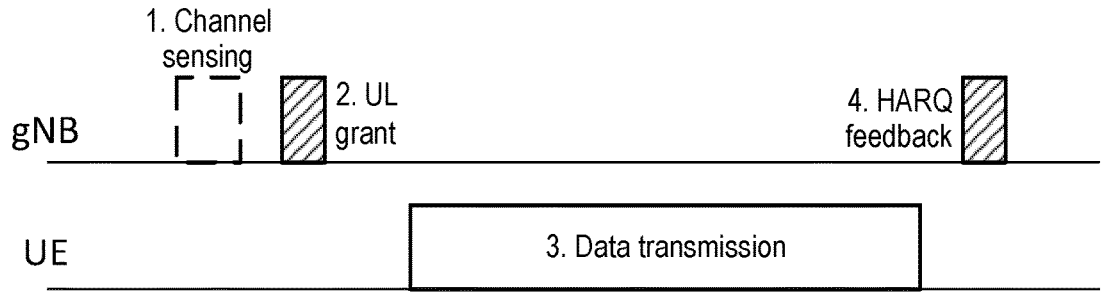
FIG. 10A-10B shows various exemplary uplink (UL) data transmission scenarios that illustrate, at a high level, a second group of embodiments of the present disclosure.
Figure 10B:
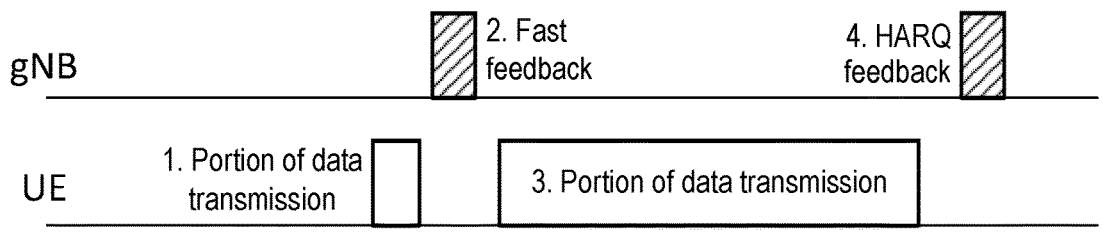

As briefly mentioned above, embodiments of the present disclosure also include a so-called "second group" that are related to transmission of UL data (e.g., from a UE to a network node). FIGS. 10A and 10B show some exemplary UL data transmission scenarios that illustrate, at a high level, the second group of embodiments. The illustrated scenarios involve a transmitter (e.g., UE operating according to NR-U) that has one or more user data packets (also called Transport Blocks, or TBs) for UL transmission to an intended receiver (e.g., a gNB). For example, the UE may have received the UL data from a user application.

In the scenario shown in FIG. 10A, the gNB schedules and/or controls UL data transmission by the UE. Meanwhile, as the receiver node of the data transmission, gNB can directly perform channel sensing towards the UE (i.e., the transmitter) before making scheduling decisions and sending an UL grant to the UE.

As illustrated in FIG. 10A, an UL data transmission session with receiver-assisted directional channel sensing starts with the gNB sensing the channel in the direction towards the UE. The gNB sends the UL grant to the UE only if the channel is determined (e.g., via the sensing) to be available. Otherwise, if the channel is unavailable (e.g., blocked), the gNB can defer scheduling the UL data transmission by the UE until a later point in time (e.g., when the channel becomes available).

Upon reception of the UL grant (e.g. of dynamically scheduled resources or a dynamic grant of resources), the UE can transmit the UL data (e.g., one or more TBs) in time and frequency resources (e.g., PUSCH resources) identified by the UL grant without first sensing the channel.

The gNB can provide implicit HARQ feedback to the UL data in a subsequent UL grant, as in conventional operation. In other words, a UL grant scheduling a new transmission implicitly confirms the successful decoding of the preceding transmission on the same HARQ process.

If the UL grant is a configured grant UL (e.g., of non-dynamically scheduled resources or a non-dynamic grant of resources), the UE can initiate the UL transmission by transmitting a relatively small amount of the UL data and waiting for the fast feedback from the gNB before transmitting the remaining amount of the UL data, as illustrated in FIG. 10B. In general, the mechanisms of the UE handling fast feedback would be similar to techniques used by the gNB for DL transmissions, described above. One possible modification is that fast feedback from gNB could have information for transmission scheme (e.g., MCS) of the remaining UL transmissions, which could be different from prior UL grants. Another possible modification is that fast feedback from gNB could carry DL data and other information. In some embodiments, the relatively small amount of the UL data may be transmitted as a short signal burst. The short signal burst may include a request for the network node to perform sensing of the channel and send fast feedback regarding channel availability. The UE may based on detecting a response to the short signal burst, from the network node, indicating that the channel is available, transmit at least a portion of the UL data to the network node In general, the process by which a gNB performs channel clearance in a specific direction, either by requesting fast feedback from UE (e.g., for DL data) or by execution of directional channel sensing (e.g., for UL data), can be considered and/or defined as a single directional channel sensing thread. In some embodiments, gNB may run multiple directional channel sensing threads in parallel. In other words, a gNB may sense the channel in multiple directions simultaneously, each of which can be associated with a different UE. The gNB can schedule DL and UL data transmissions for the respective UEs based on the results obtained by operations of the respective channel sensing threads. In this manner, in the same time interval, the gNB may schedule data transmission for UEs in directions where the channel is sensed to be available, but refrain from scheduling data transmission for other UEs in directions where the channel is sensed to be unavailable—even if there is data pending to/from those UEs.

The so-called "first group" of embodiments described above can be further illustrated with reference to FIGS. 11-12, which depicts exemplary methods performed by a network node and a UE, respectively. In other words, various features of the operations described below, with reference to FIGS. 11-12, correspond to various embodiments described above.

Figure 11:
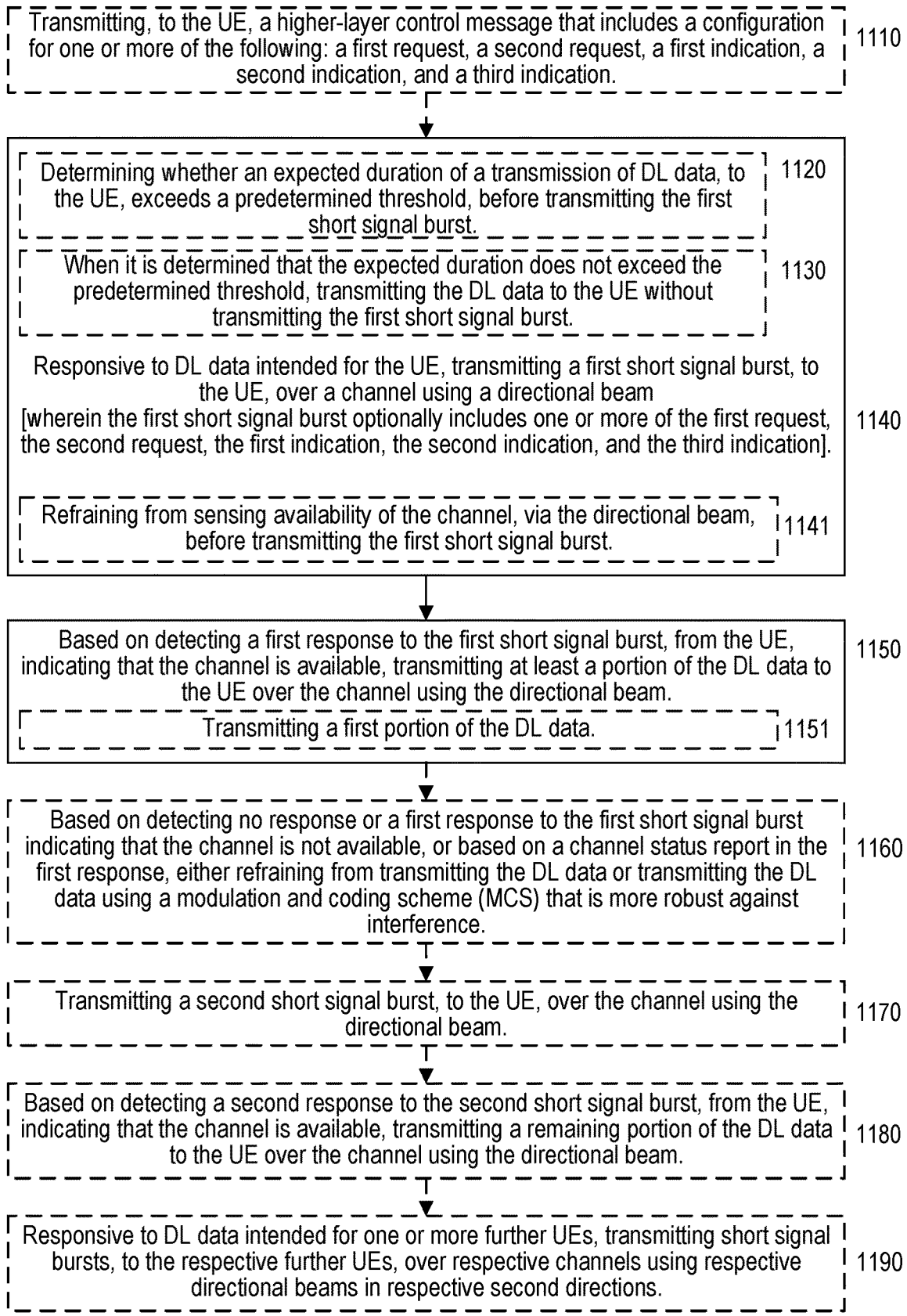
FIG. 11 shows a flow diagram of an exemplary method (e.g., procedure) performed by a network node (e.g., base station, eNB, gNB, en-gNB, etc., or component thereof), according to various exemplary embodiments of the present disclosure.

In particular, FIG. 11 shows a flow diagram of an exemplary method (e.g., procedure) for transmitting downlink (DL) data to a user equipment (UE) in unlicensed spectrum, according to various exemplary embodiments of the present disclosure. The exemplary method can be performed by a network node (e.g., base station, eNB, gNB, en-gNB, etc., or component thereof) in the wireless network (e.g., E-UTRAN, NG-RAN). For example, the exemplary method shown in FIG. 11 can be implemented in a network node configured as described herein with reference to other figures. In addition, the exemplary method shown in FIG. 11 can be used cooperatively with other exemplary methods described herein (e.g., FIG. 12) to provide various exemplary advantages described here. Although FIG. 11 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 11 can include the operations of blocks 1140, where the network node can transmit a first short signal burst, to the UE, over a channel using a directional beam. The transmission can be responsive to DL data intended for the UE (e.g., received from a core network). In some embodiments, the operations of block 1140 can include the operations of sub-block 1141, where the network node can refrain from sensing availability of the channel, via the directional beam, before transmitting the first short signal burst. In other words, the network node can transmit the first short signal burst without first sensing availability of the channel.

The exemplary method can also include the operations of block 1150, where the network node can, based on detecting a first response to the first short signal burst, from the UE, indicating that the channel is available, transmit at least a portion of the DL data to the UE over the channel using the directional beam. The at least a portion of the DL data may be a part or the whole of the DL data.

In some embodiments, the transmitting operations of block 1150 can include the operations of sub-block 1151, where the network node can transmit a first portion of the DL data. Such embodiments can also include the operations of blocks 1170-1180. In block 1170, the network node can transmit a second short signal burst, to the UE, over the channel using the directional beam. In block 1180, the network node can, based on detecting a second response to the second short signal burst, from the UE, indicating that the channel is available, transmit a remaining portion of the DL data to the UE over the channel using the directional beam. For example, each of the first portion and the remaining portion can include one or more TBs of data.

In some embodiments, the operations of block 1140 can include the operations of blocks 1120-1130. In block 1120, responsive to DL data intended for the UE, the network node can determine whether an expected duration of a transmission of the DL data exceeds a predetermined threshold, before transmitting the first short signal burst. In block 1130, when it is determined that the expected duration does not exceed the predetermined threshold, the network node can transmit the DL data to the UE without transmitting the first short signal burst. In this manner, the network node can perform relatively short data transmissions without the signaling overhead associated with requesting and receiving feedback from the UE receiver. In some embodiments in which the network node determines that the network node is in an interference-free environment (e.g. there are not any neighboring networks in the same spectrum in the close vicinity), the network node may perform DL data transmission without transmitting the first short signal burst.

In some embodiments, the exemplary method can include the operations of block 1160, where the network node can perform various operations based on detecting a first response to the first short signal burst indicating that the channel is not available, detecting no response to the first short signal burst, and/or a channel status report included in the first response. In various embodiments, if one or more of these conditions are fulfilled, the various operations may include refraining from transmitting the DL data to the UE or transmitting the DL data to UE using a modulation and coding scheme (MCS) that is more robust against interference, e.g. best matches the reported channel status.

In some embodiments, the exemplary method can include the operations of block 1190, where the network node can, responsive to DL data intended for one or more further UEs, transmit short signal bursts, to the respective further UEs, over respective channels using respective directional beams in respective second directions. In such embodiments, the directional beam used in relation to the UE (e.g., in blocks 1140-1150) can be in a first direction, and at least one of the second directions is different than the first direction.

In some embodiments, the first short signal burst may include one or more of the following information:
a first request for the UE to perform sensing of the channel and transmit fast feedback regarding channel availability in the first response;
a second request for the UE to provide one or more of the following information in the first response: a beam measurement report, a scheduling request, and a buffer status report;
a first indication of time and frequency resources on which the UE should transmit the first response;
a second indication of one or more measurement types requested, including any of the following:
energy level for the channel,
interference level for the channel, and
signal-to-interference-and-noise ratio (SINR) for the channel; and
a third indication of one or more conditions under which the UE should transmit fast feedback regarding channel availability in response to receiving a short signal burst.
For example, if the first short signal burst is transmitted as downlink control information (DCI), any of the above requests and indications can be included in one or more fields in the DCI.

In some embodiments, the first indication of time resources comprises a time offset relative to a first time resource in which the first short signal burst was transmitted. In some embodiments, the one of more conditions, indicated by the third indication, include an absolute threshold, a relative threshold, and/or an index to an entry in a table of conditions provided in a higher-layer control message.

In some embodiments, the first short signal burst can also include one or more reference signals (RS) and/or a portion of the DL data.

In some embodiments, the exemplary method can also include the operations of block 1110, where the network node can transmit, to the UE, a higher-layer control message that includes a configuration for one or more of the following:
a first request indicating that the UE should, when subsequently detecting a short signal burst, perform sensing of the channel and transmit fast feedback regarding channel availability;
a second request indicating that the UE should, when subsequently detecting a short signal burst, transmit fast feedback including one or more of the following information: a beam measurement report, a scheduling request, and a buffer status report;
a first indication of time and frequency resources on which the UE should, when subsequently detecting a short signal burst, transmit fast feedback;
a second indication of one or more measurement types that the UE should, when subsequently detecting a short signal burst, provide in the fast feedback, including any of the following:
energy level for the channel,
interference level for the channel, and
signal-to-interference-and-noise ratio (SINR) for the channel; and
a third indication of one or more conditions under which the UE should send fast feedback regarding channel availability in response to receiving a short signal burst.
The configuration may be a semi-static configuration. For example, the higher-layer control message can be an RRC message that includes various configuration parameters, such as discussed above. Such configuration parameters can comprise a semi-static configuration. In some embodiments, the one of more conditions, indicated by the third indication, include an absolute threshold, a relative threshold, and/or a table of conditions.

Note that the configuration for the various requests and indications can be transmitted to the UE in various combinations in the higher-layer control message (in block 1110) and with the first short signal burst (in block 1140). For example, the table of conditions can be provided in the higher-layer control message and the index to an entry in the table can be provided with the short signal burst. As another example, certain requests and/or indications can be provided in the higher-layer control message, while others can be provided with the first short signal burst. Other combinations and/or variants are also possible.

In some embodiments, the first response, from the UE, can include one or more of the following information: fast feedback regarding channel availability, a beam measurement report, a scheduling request, a buffer status report, and one or more channel measurements. The channel measurements may include any of the following:
 energy level for the channel,
 interference level for the channel, and
 signal-to-interference-and-noise ratio (SINR) for the channel.

Figure 12:
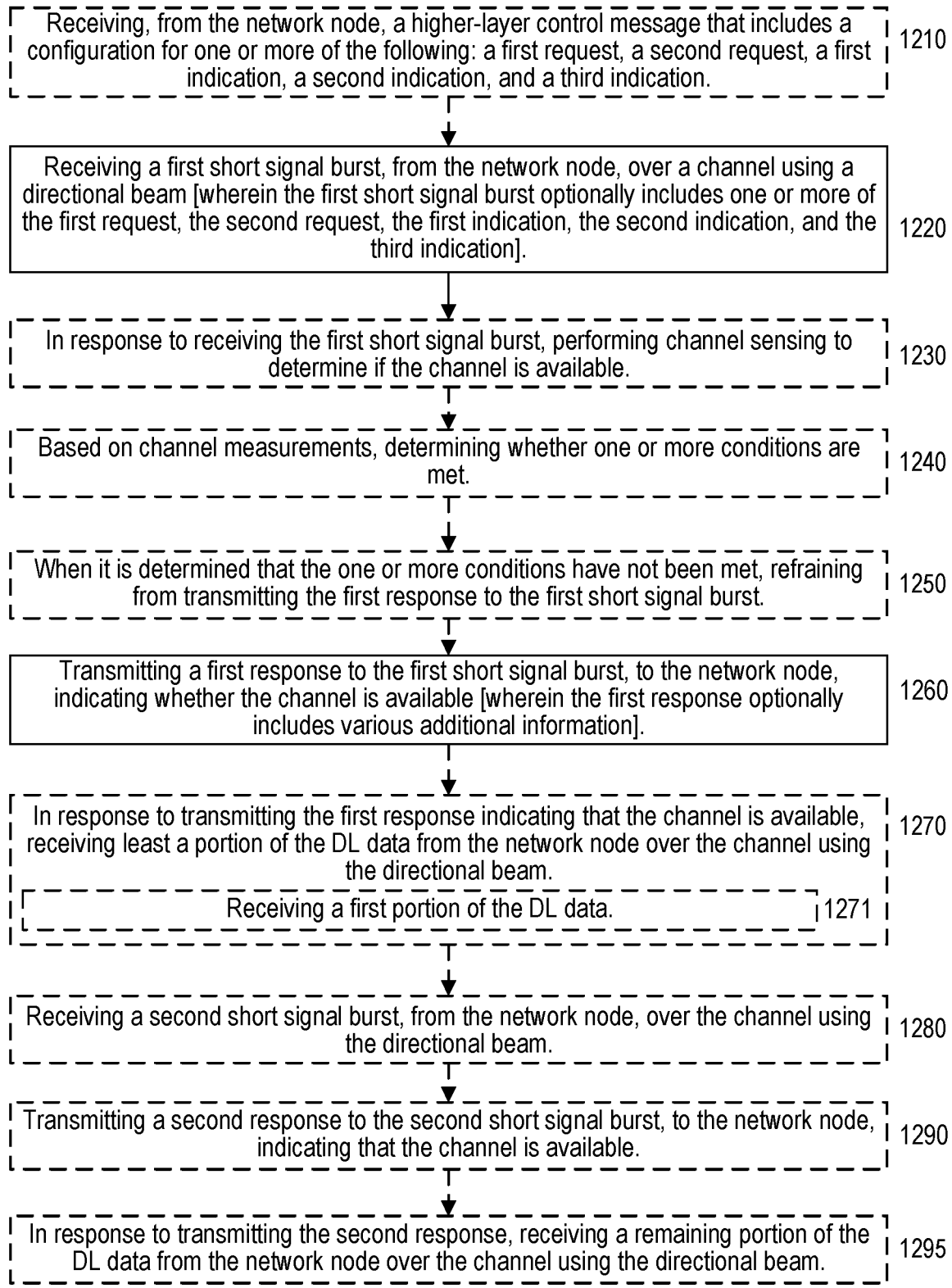
FIG. 12 shows a flow diagram of an exemplary method (e.g., procedure) performed by a user equipment (UE, e.g., wireless device, IoT device, etc.), according to various exemplary embodiments of the present disclosure.

In addition, FIG. 12 shows a flow diagram of an exemplary method (e.g., procedure) for receiving downlink (DL) data via unlicensed spectrum from a network node in a wireless network, according to various exemplary embodiments of the present disclosure. The exemplary method can be performed by a user equipment (UE, e.g., wireless device, IoT device, modem, etc. or component thereof) in communication with a network node (e.g., base station, eNB, gNB, en-gNB, etc., or component thereof) in the wireless network (e.g., E-UTRAN, NG-RAN). For example, the exemplary method shown in FIG. 12 can be implemented in a UE configured as described herein with reference to other figures. In addition, the exemplary method shown in FIG. 12 can be used cooperatively with other exemplary methods described herein (e.g., FIG. 11) to provide various exemplary advantages described here. Although FIG. 12 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 12 can include the operations of blocks 1220, where the UE can receive a first short signal burst, from the network node, over a channel using a directional beam. In some embodiments, the exemplary method can also include the operations of blocks 1230, where the UE can, in response to receiving the first short signal burst, perform channel sensing to determine if the channel is available. The exemplary method can also include the operations of blocks 1260, where the UE can transmit a first response to the first short signal burst, to the network node, indicating whether the channel is available. In some embodiments, the exemplary method can also include the operations of blocks 1270, where the UE can, in response to transmitting the first response indicating that the channel is available, receive at least a portion of the DL data from the network node over the channel using the directional beam. The at least a portion of the DL data may be a part or the whole of the DL data.

In some embodiments, the receiving operations of block 1270 can include the operations of sub-block 1271, where the UE can receive a first portion of the DL data. Such embodiments can also include the operations of blocks 1280-1295. In block 1280, the UE can receive a second short signal burst, from the network node, over the channel using the directional beam. In block 1290, the UE can transmit a second response to the second short signal burst, to the network node, indicating that the channel is available. In block 1295, the UE can, in response to transmitting the second response, receive a remaining portion of the DL data from the network node over the channel using the directional beam. For example, each of the first portion and the remaining portion can include one or more TBs of data.

In some embodiments, the first short signal burst can include one or more of the following information:
 a first request for the UE to perform sensing of the channel and transmit fast feedback regarding channel availability in the first response;
 a second request for the UE to provide one or more of the following information in the first response: a beam measurement report, a scheduling request, and a buffer status report;
 a first indication of time and frequency resources on which the UE should transmit the first response;
 a second indication of one or more measurement types requested, including any of the following:
  energy level for the channel,
  interference level for the channel, and
  signal-to-interference-and-noise ratio (SINR) for the channel; and
 a third indication of one or more conditions under which the UE should transmit fast feedback regarding channel availability in response to receiving a short signal burst.

For example, if the first short signal burst is transmitted as downlink control information (DCI), any of the above requests and indications can be included in one or more fields in the DCI.

In some embodiments, the first indication of time resources comprises a time offset relative to a first time resource in which the first short signal burst was transmitted. In some embodiments, the one or more conditions, indicated by the third indication, can include an absolute threshold, a relative threshold, and/or an index to an entry in a table of conditions provided in a higher-layer control message.

In some embodiments, the first short signal burst can also include one or more reference signals (RS) and/or a portion of the DL data.

In some embodiments, the exemplary method can also include the operations of block 1210, where the UE can receive, from the network node, a higher-layer control message that includes a configuration for one or more of the following information:
 a first request indicating that the UE should, when subsequently detecting a short signal burst, perform sensing of the channel and transmit fast feedback regarding channel availability;
 a second request indicating that the UE should, when subsequently detecting a short signal burst, transmit fast feedback including one or more of the following information: a beam measurement report, a scheduling request, and a buffer status report;
 a first indication of time and frequency resources on which the UE should, when subsequently detecting a short signal burst, transmit fast feedback;
 a second indication one or more measurement types that the UE should, when subsequently detecting a short signal burst, provide in the fast feedback, including any of the following:
  energy level for the channel,
  interference level for the channel, and
  signal-to-interference-and-noise ratio (SINR) for the channel; and
 a third indication of one or more conditions under which the UE should send fast feedback regarding channel availability in response to receiving a short signal burst.

The configuration may be a semi-static configuration. For example, the higher-layer control message can be an RRC message that includes various configuration parameters, such as discussed above. Such configuration parameters can comprise a semi-static configuration. In some embodiments, the one of more conditions, indicated by the third indication, include an absolute threshold, a relative threshold, and/or a table of conditions.

Note that the configuration for the various requests and indications can be received by the UE in various combinations in the higher-layer control message (in block 1210) and with the first short signal burst (in block 1220). For example, the table of conditions can be provided in the higher-layer control message and the index to an entry in the table can be provided with the short signal burst. As another example, certain requests and/or indications can be provided in the higher-layer control message, while others can be provided with the first short signal burst. Other combinations and/or variants are also possible.

In some embodiments, the one or more conditions (e.g., indicated by the third indication in the first short signal burst and/or the higher-layer control message) include a maximum absolute power level in the channel and/or a minimum signal-to-interference-and-noise ratio (SINR) in the channel. In such embodiments, the exemplary method also includes the operations of blocks 1240-1250. In block 1240, the UE can, based on channel measurements, determine whether one or more conditions are met. In block 1250, when it is determined that the one or more conditions have not been met, the UE can refrain from transmitting the first response to the first short signal burst. In some embodiments, the UE can transmit the first response (e.g., in block 1260) when it is determined (e.g., in block 1240) that the one or more conditions have been met.

In some embodiments, the first response, from the UE, can include one or more of the following information: fast feedback regarding channel availability, a beam measurement report, a scheduling request, a buffer status report, and one or more channel measurements. The channel measurements can include any of the following:
  energy level for the channel,
  interference level for the channel, and
  signal-to-interference-and-noise ratio (SINR) for the channel.

The so-called "second group" of embodiments described above can be further illustrated with reference to FIGS. 13-14, which depict exemplary methods performed by a network node and a UE, respectively. In other words, various features of the operations described below, with reference to FIGS. 13-14, correspond to various embodiments described above.

Figure 13:
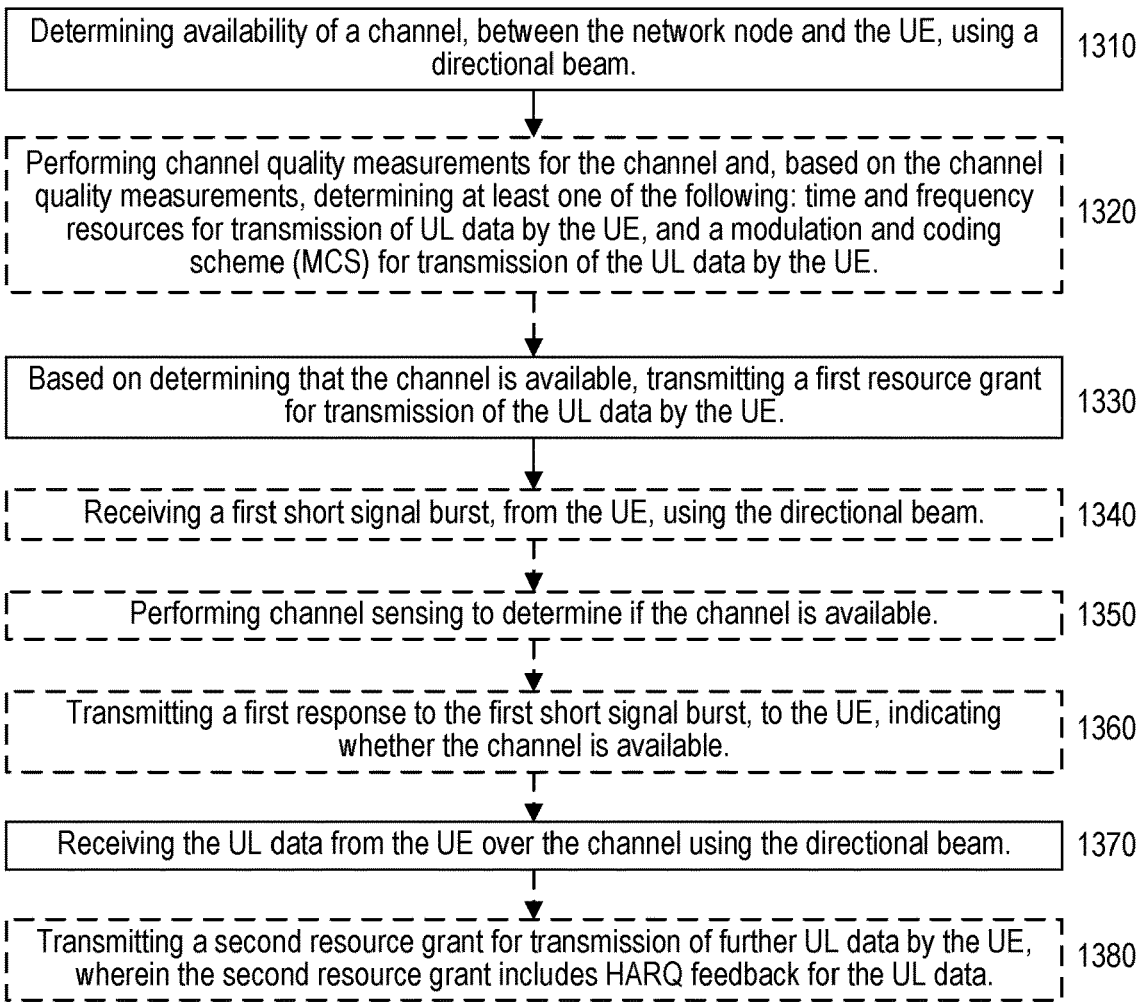
FIG. 13 shows a flow diagram of an exemplary method (e.g., procedure) performed by a network node (e.g., base station, eNB, gNB, en-gNB, etc., or component thereof), according to various exemplary embodiments of the present disclosure.

In particular, FIG. 13 shows a flow diagram of an exemplary method (e.g., procedure) for receiving uplink (UL) data from a user equipment (UE) in unlicensed spectrum, according to various exemplary embodiments of the present disclosure. The exemplary method can be performed by a network node (e.g., base station, eNB, gNB, en-gNB, etc., or component thereof) in the wireless network (e.g., E-UTRAN, NG-RAN). For example, the exemplary method shown in FIG. 13 can be implemented in a network node configured as described herein with reference to other figures. In addition, the exemplary method shown in FIG. 13 can be used cooperatively with other exemplary methods described herein (e.g., FIG. 14) to provide various exemplary advantages described here. Although FIG. 13 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 13 can include the operations of blocks 1310, where the network node can determine availability of a channel, between the network node and the UE, using a directional beam. The exemplary method can also include the operations of blocks 1330, where the network node can, based on determining that the channel is available, transmit a first resource grant for transmission of the UL data by the UE. The exemplary method can also include the operations of blocks 1370, where the network node can receive the UL data from the UE over the channel using the directional beam.

In some embodiments, the exemplary method can also include the operations of blocks 1320, where the network node can perform channel quality measurements for the channel and, based on the channel quality measurements, determine at least one of the following for inclusion in the first resource grant: time and frequency resources for transmission of the UL data; and a modulation and coding scheme (MCS) for transmission of the UL data.

In some embodiments, the first resource grant can be a configured grant of resources for a plurality of UL transmission opportunities for the UE. In such embodiments, the exemplary method can also include the operations of blocks 1340-1360. In block 1340, the network node can, responsive to the configured grant, receive a first short signal burst, from the UE, over the channel using the directional beam. In block 1350, the network node can perform channel sensing to determine if the channel is available. In block 1360, the network node can transmit a first response to the first short signal burst, to the UE, indicating whether the channel is available. In some embodiments, the first short signal burst can include a first request for the network node to perform sensing of the channel and send fast feedback regarding channel availability. In such embodiments, the operations of blocks 1350-1360 can be responsive to the first request. In certain scenario in which the first resource grant is a configured grant, the network node may receive a first short signal burst from the UE using a directional beam without first performing the operations of blocks 1310 and 1330.

In some of the embodiments in which the first resource grant is a configured grant, the UL data can be received during a first one of the UL transmission opportunities. In such embodiments, the first response can also include downlink data for the UE and/or configuration information (e.g., MCS) related to one or more subsequent UL transmission opportunities.

In other embodiments, the first resource grant can be a dynamic grant of resources for a single UL transmission opportunity for the UE. In such embodiments, the exemplary method can also include the operations of block 1380, where the network node can, in response to receiving the UL data (e.g., in block 1370), transmit a second resource grant for transmission of further UL data by the UE. The second resource grant may comprise hybrid ARQ (HARQ) feedback for the UL data.

Figure 14:
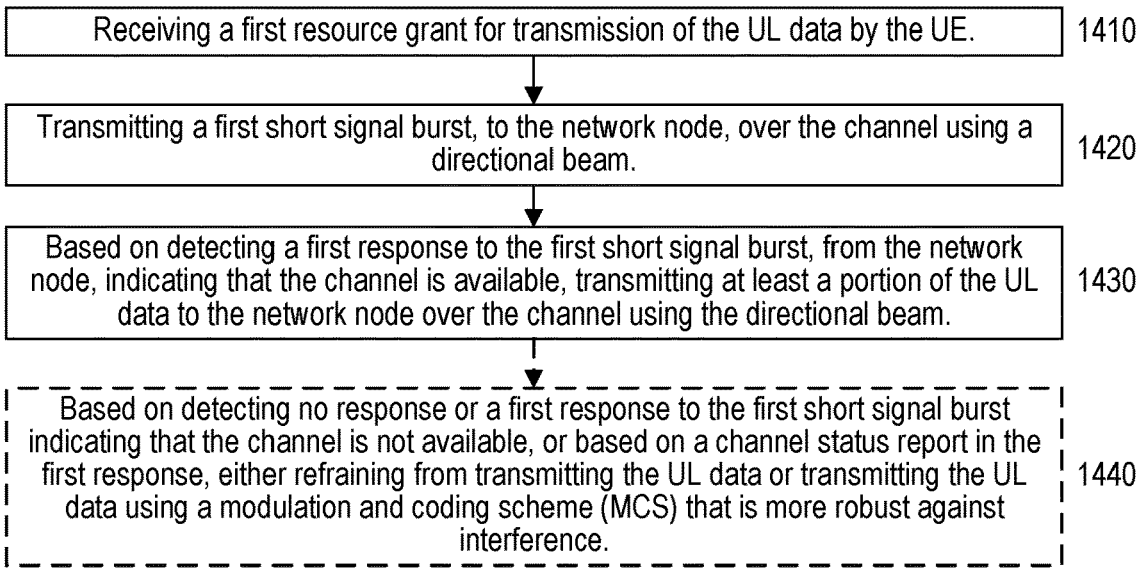
FIG. 14 shows a flow diagram of an exemplary method (e.g., procedure) performed by a user equipment (UE, e.g., wireless device, IoT device, etc.), according to various exemplary embodiments of the present disclosure.

In addition, FIG. 14 shows a flow diagram of an exemplary method (e.g., procedure) for transmitting uplink (UL) data via unlicensed spectrum to a network node in a wireless network, according to various exemplary embodiments of the present disclosure. The exemplary method can be performed by a user equipment (UE, e.g., wireless device, IoT device, modem, etc. or component thereof) in communication with a network node (e.g., base station, eNB, gNB, en-gNB, etc., or component thereof) in the wireless network (e.g., E-UTRAN, NG-RAN). For example, the exemplary method shown in FIG. 14 can be implemented in a UE configured as described herein with reference to other figures. In addition, the exemplary method shown in FIG. 14 can be used cooperatively with other exemplary methods described herein (e.g., FIG. 13) to provide various exemplary advantages described here. Although FIG. 14 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 14 can include the operations of blocks 1410, where the UE can receive a first resource grant for transmission of UL data by the UE. The exemplary method may also include the operations of block 1420, where the UE can, responsive to the resource grant, transmit a first short signal burst, to the network node, over a channel using a directional beam. In some embodiments, the first short signal burst may include a first request for the network node to perform sensing of the channel and send fast feedback regarding channel availability. The exemplary method may also include the operations of block 1430, where the UE can, based on detecting a first response to the first short signal burst, from the network node, indicating that the channel is available, transmit at least a portion of the UL data to the network node over the channel using the directional beam.

In some embodiments, the first resource grant can be a configured grant of resources for a plurality of UL transmission opportunities for the UE. In some of these embodiments, the UL data can be transmitted during a first one of the UL transmission opportunities, and the first response can include downlink data for the UE and/or configuration information (e.g., MCS) related to one or more subsequent UL transmission opportunities.

In some embodiments, the exemplary method may also include the operations of block 1440, where the UE can perform various operations based on detecting a first response to the first short signal burst indicating that the channel is not available, detecting a first response to the first short signal burst indicating a different frequency resource and/or a different modulation and coding scheme (MCS) to be used for transmitting the UL data, and/or detecting no response to the first short signal burst. In various embodiments, if one or more of these conditions are fulfilled, the various operations can include refraining from transmitting the UL data to the network node or transmitting the UL data to network node using a modulation and coding scheme (MCS) that is more robust against interference, e.g. using the indicated frequency resource and/or the MCS in the first response.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 15:
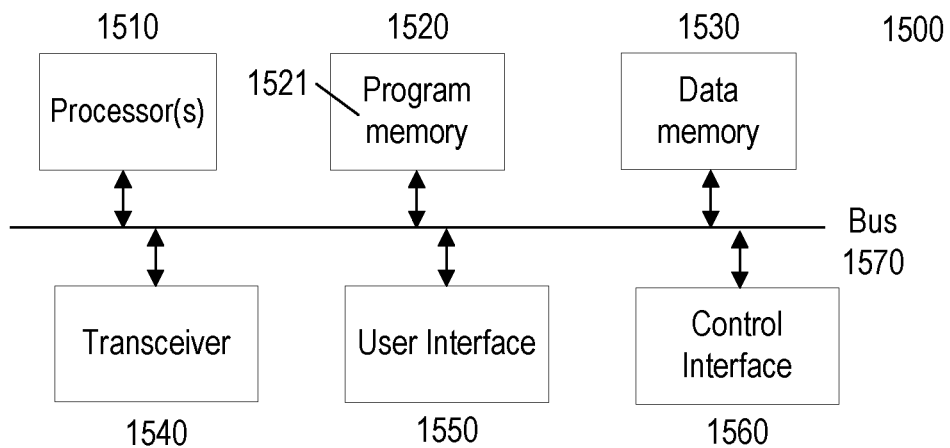
FIG. 15 is a block diagram of an exemplary wireless device or UE according to various exemplary embodiments of the present disclosure.

FIG. 15 shows a block diagram of an exemplary wireless device or user equipment (UE) 1500 (hereinafter referred to as "UE 1500") according to various embodiments of the present disclosure, including those described above with reference to other figures. For example, UE 1500 can be configured by execution of instructions, stored on a computer-readable medium, to perform operations corresponding to one or more of the exemplary methods described herein.

UE 1500 can include a processor 1510 (also referred to as "processing circuitry") that can be operably connected to a program memory 1520 and/or a data memory 1530 via a bus 1570 that can comprise parallel address and data buses, serial ports, or other methods and/or structures known to those of ordinary skill in the art. Program memory 1520 can store software code, programs, and/or instructions (collectively shown as computer program product 1521 in FIG. 15) that, when executed by processor 1510, can configure and/or facilitate UE 1500 to perform various operations, including operations corresponding to various exemplary methods described herein. As part of or in addition to such operations, execution of such instructions can configure and/or facilitate UE 1500 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1540, user interface 1550, and/or control interface 1560.

As another example, processor 1510 can execute program code stored in program memory 1520 that corresponds to MAC, RLC, PDCP, and RRC layer protocols standardized by 3GPP (e.g., for NR and/or LTE). As a further example, processor 1510 can execute program code stored in program memory 1520 that, together with radio transceiver 1540, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1510 can execute program code stored in program memory 1520 that, together with radio transceiver 1540, implements device-to-device (D2D) communications with other compatible devices and/or UEs.

Program memory 1520 can also include software code executed by processor 1510 to control the functions of UE 1500, including configuring and controlling various components such as radio transceiver 1540, user interface 1550, and/or control interface 1560. Program memory 1520 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1520 can comprise an external storage arrangement (not shown) remote from UE 1500, from which the instructions can be downloaded into program memory 1520 located within or removably coupled to UE 1500, so as to enable execution of such instructions.

Data memory 1530 can include memory area for processor 1510 to store variables used in protocols, configuration, control, and other functions of UE 1500, including operations corresponding to, or comprising, any of the exemplary methods described herein. Moreover, program memory 1520 and/or data memory 1530 can include non-volatile memory (e.g., flash memory), volatile memory (e.g., static or dynamic RAM), or a combination thereof. Furthermore, data memory 1530 can comprise a memory slot by which removable memory cards in one or more formats (e.g., SD Card, Memory Stick, Compact Flash, etc.) can be inserted and removed.

Persons of ordinary skill will recognize that processor 1510 can include multiple individual processors (including, e.g., multi-core processors), each of which implements a portion of the functionality described above. In such cases, multiple individual processors can be commonly connected to program memory 1520 and data memory 1530 or individually connected to multiple individual program memories and or data memories. More generally, persons of ordinary skill in the art will recognize that various protocols and other functions of UE 1500 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1540 can include radio-frequency transmitter and/or receiver functionality that facilitates the UE 1500 to communicate with other equipment supporting like wireless communication standards and/or protocols. In some exemplary embodiments, the radio transceiver 1540 includes one or more transmitters and one or more receivers that enable UE 1500 to communicate according to various protocols and/or methods proposed for standardization by 3GPP and/or other standards bodies. For example, such functionality can operate cooperatively with processor 1510 to implement a PHY layer based on OFDM, OFDMA, and/or SC-FDMA technologies, such as described herein with respect to other figures.

In some exemplary embodiments, radio transceiver 1540 includes one or more transmitters and one or more receivers that can facilitate the UE 1500 to communicate with various LTE, LTE-Advanced (LTE-A), and/or NR networks according to standards promulgated by 3GPP. In some exemplary embodiments of the present disclosure, the radio transceiver 1540 includes circuitry, firmware, etc. necessary for the UE 1500 to communicate with various NR, NR-U, LTE, LTE-A, LTE-LAA, UMTS, and/or GSM/EDGE networks, also according to 3GPP standards. In some embodiments, radio transceiver 1540 can include circuitry supporting D2D communications between UE 1500 and other compatible devices.

In some embodiments, radio transceiver 1540 includes circuitry, firmware, etc. necessary for the UE 1500 to communicate with various CDMA2000 networks, according to 3GPP2 standards. In some embodiments, the radio transceiver 1540 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1540 can include a transceiver that is capable of wired communication, such as by using IEEE 802.3 Ethernet technology. The functionality particular to each of these embodiments can be coupled with and/or controlled by other circuitry in the UE 1500, such as the processor 1510 executing program code stored in program memory 1520 in conjunction with, and/or supported by, data memory 1530.

User interface 1550 can take various forms depending on the particular embodiment of UE 1500, or can be absent from UE 1500 entirely. In some embodiments, user interface 1550 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1500 can comprise a tablet computing device including a larger touchscreen display. In such embodiments, one or more of the mechanical features of the user interface 1550 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1500 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1500 having a touch screen display are capable of receiving user inputs, such as inputs related to exemplary methods described herein or otherwise known to persons of ordinary skill.

In some embodiments, UE 1500 can include an orientation sensor, which can be used in various ways by features and functions of UE 1500. For example, the UE 1500 can use outputs of the orientation sensor to determine when a user has changed the physical orientation of the UE 1500's touch screen display. An indication signal from the orientation sensor can be available to any application program executing on the UE 1500, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1560 of the UE 1500 can take various forms depending on the particular exemplary embodiment of UE 1500 and of the particular interface requirements of other devices that the UE 1500 is intended to communicate with and/or control. For example, the control interface 1560 can comprise an RS-232 interface, an RS-4155 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1560 can comprise an IEEE 802.3 Ethernet interface such as described above. In some exemplary embodiments of the present disclosure, the control interface 1560 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1500 can comprise more functionality than is shown in FIG. 15 including, for example, a video and/or still-image camera, microphone, media player and/or recorder, etc. Moreover, radio transceiver 1540 can include circuitry necessary to communicate using additional radio-frequency communication standards including Bluetooth, GPS, and/or others. Moreover, the processor 1510 can execute software code stored in the program memory 1520 to control such additional functionality. For example, directional velocity and/or position estimates output from a GPS receiver can be available to any application program executing on the UE 1500, including any program code corresponding to and/or embodying any exemplary embodiments (e.g., of methods) described herein.

Figure 16:
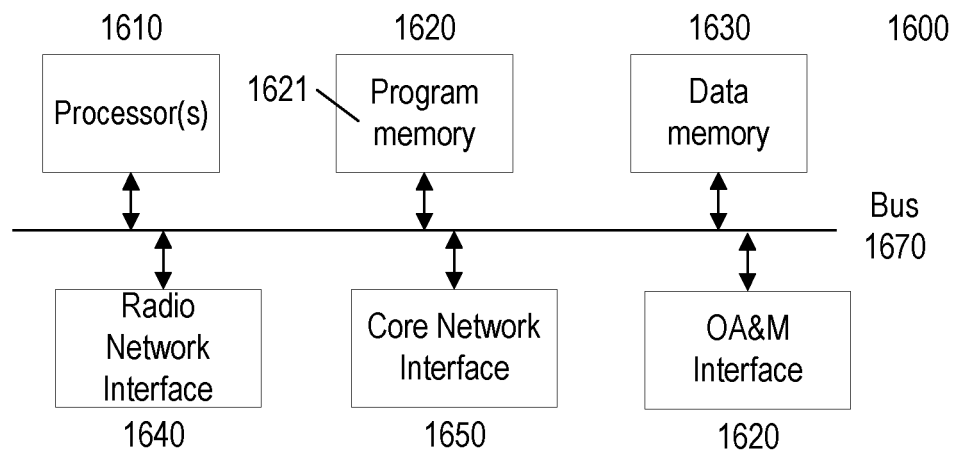
FIG. 16 is a block diagram of an exemplary network node according to various exemplary embodiments of the present disclosure.

FIG. 16 shows a block diagram of an exemplary network node 1600 according to various embodiments of the present disclosure, including those described above with reference to other figures. For example, exemplary network node 1600 can be configured by execution of instructions, stored on a computer-readable medium, to perform operations corresponding to one or more of the exemplary methods described herein. In some exemplary embodiments, network node 1600 can comprise a base station, eNB, gNB, or one or more components thereof. For example, network node 1600 can be configured as a central unit (CU) and one or more distributed units (DUs) according to NR gNB architectures specified by 3GPP. More generally, the functionally of network node 1600 can be distributed across various physical devices and/or functional units, modules, etc.

Network node 1600 can include processor 1610 (also referred to as "processing circuitry") that is operably connected to program memory 1620 and data memory 1630 via bus 1670, which can include parallel address and data buses, serial ports, or other methods and/or structures known to those of ordinary skill in the art.

Program memory 1620 can store software code, programs, and/or instructions (collectively shown as computer program product 1621 in FIG. 16) that, when executed by processor 1610, can configure and/or facilitate network node 1600 to perform various operations, including operations corresponding to various exemplary methods described herein. As part of and/or in addition to such operations, program memory 1620 can also include software code executed by processor 1610 that can configure and/or facilitate network node 1600 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1640 and/or core network interface 1650. By way of example, core network interface 1650 can comprise the S1 or NG interface and radio network interface 1640 can comprise the Uu interface, as standardized by 3GPP. Program memory 1620 can also comprise software code executed by processor 1610 to control the functions of network node 1600, including configuring and controlling various components such as radio network interface 1640 and core network interface 1650.

Data memory 1630 can comprise memory area for processor 1610 to store variables used in protocols, configuration, control, and other functions of network node 1600. As such, program memory 1620 and data memory 1630 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1610 can include multiple individual processors (not shown), each of which implements a portion of the functionality described above. In such case, multiple individual processors may be commonly connected to program memory 1620 and data memory 1630 or individually connected to multiple individual program memories and/or data memories. More generally, persons of ordinary skill will recognize that various protocols and other functions of network node 1600 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1640 can comprise transmitters, receivers, signal processors, ASICs, antennas, beamforming units, and other circuitry that enables network node 1600 to communicate with other equipment such as, in some embodiments, a plurality of compatible user equipment (UE). In some embodiments, interface 1640 can also enable network node 1600 to communicate with compatible satellites of a satellite communication network. In some exemplary embodiments, radio network interface 1640 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1640. According to further exemplary embodiments of the present disclosure, the radio network interface 1640 can comprise a PHY layer based on OFDM, OFDMA, and/or SC-FDMA technologies. In some embodiments, the functionality of such a PHY layer can be provided cooperatively by radio network interface 1640 and processor 1610 (including program code in memory 1620).

Core network interface 1650 can comprise transmitters, receivers, and other circuitry that enables network node 1600 to communicate with other equipment in a core network such as, in some embodiments, circuit-switched (CS) and/or packet-switched Core (PS) networks. In some embodiments, core network interface 1650 can comprise the S1 interface standardized by 3GPP. In some embodiments, core network interface 1650 can comprise the NG interface standardized by 3GPP. In some exemplary embodiments, core network interface 1650 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1650 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1600 can include hardware and/or software that configures and/or facilitates network node 1600 to communicate with other network nodes in a RAN, such as with other eNBs, gNBs, ng-eNBs, en-gNBs, IAB nodes, etc. Such hardware and/or software can be part of radio network interface 1640 and/or core network interface 1650, or it can be a separate functional unit (not shown). For example, such hardware and/or software can configure and/or facilitate network node 1600 to communicate with other RAN nodes via the X2 or Xn interfaces, as standardized by 3GPP.

OA&M interface 1660 can comprise transmitters, receivers, and other circuitry that enables network node 1600 to communicate with external networks, computers, databases, and the like for purposes of operations, administration, and maintenance of network node 1600 or other network equipment operably connected thereto. Lower layers of OA&M interface 1660 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1640, core network interface 1650, and OA&M interface 1660 may be multiplexed together on a single physical interface, such as the examples listed above.

Figure 17:
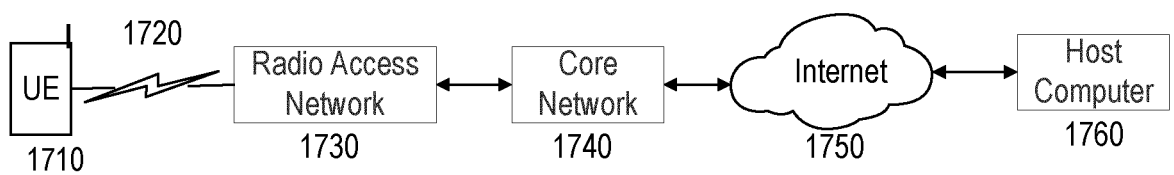
FIG. 17 is a block diagram of an exemplary network configured to provide over-the-top (OTT) data services between a host computer and a UE, according to various exemplary embodiments of the present disclosure.

FIG. 17 is a block diagram of an exemplary communication network configured to provide over-the-top (OTT) data services between a host computer and a user equipment (UE), according to one or more exemplary embodiments of the present disclosure. UE 1710 can communicate with radio access network (RAN) 1730 over radio interface 1720, which can be based on protocols described above including, e.g., LTE, LTE-A, and 5G/NR. For example, UE 1710 can be configured and/or arranged as shown in other figures discussed above.

RAN 1730 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band, a 5-GHz band and/or some other suitable frequency band. In such cases, the network nodes comprising RAN 1730 can cooperatively operate using licensed and unlicensed spectrum. In some embodiments, RAN 1730 can include, or be capable of communication with, one or more satellites comprising a satellite access network.

RAN 1730 can further communicate with core network 1740 according to various protocols and interfaces described above. For example, one or more apparatus (e.g., base stations, eNBs, gNBs, etc.) comprising RAN 1730 can communicate to core network 1740 via core network interface 1750 described above. In some exemplary embodiments, RAN 1730 and core network 1740 can be configured and/or arranged as shown in other figures discussed above. For example, eNBs comprising an E-UTRAN 1730 can communicate with an EPC core network 1740 via an S1 interface. As another example, gNBs and ng-eNBs comprising an NG-RAN 1730 can communicate with a 5GC core network 1730 via an NG interface.

Core network 1740 can further communicate with an external packet data network, illustrated in FIG. 17 as Internet 1750, according to various protocols and interfaces known to persons of ordinary skill in the art. Many other devices and/or networks can also connect to and communicate via Internet 1750, such as exemplary host computer 1760. In some exemplary embodiments, host computer 1760 can communicate with UE 1710 using Internet 1750, core network 1740, and RAN 1730 as intermediaries. Host computer 1760 can be a server (e.g., an application server) under ownership and/or control of a service provider. Host computer 1760 can be operated by the OTT service provider or by another entity on the service provider's behalf.

For example, host computer 1760 can provide an over-the-top (OTT) packet data service to UE 1710 using facilities of core network 1740 and RAN 1730, which can be unaware of the routing of an outgoing/incoming communication to/from host computer 1760. Similarly, host computer 1760 can be unaware of routing of a transmission from the host computer to the UE, e.g., the routing of the transmission through RAN 1730. Various OTT services can be provided using the exemplary configuration shown in FIG. 17 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 17 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide enhanced techniques for selecting beams for random during unlicensed (e.g., NR-U) operation when directional listen-before-talk (LBT) is used by a UE. Such embodiments can cause the UE to avoid being stalled on a serving beam due to occurrence of consistent UL LBT failures, and can provide a way for a UE to quickly recover from consistent LBT failures on a serving beam. Furthermore, such embodiments can mitigate and/or reduce interruptions to UE services due to LBT failures, thereby facilitating use of services (e.g., eMBB, URLLC, etc.) on unlicensed spectrum. When used in NR UEs (e.g., UE 1710) and gNBs (e.g., gNBs comprising RAN 1730), exemplary embodiments described herein can provide various improvements, benefits, and/or advantages that facilitate and/or improve the use of data services (e.g., URLLC) in unlicensed spectrum. As a consequence, this improves the performance of these services as experienced by OTT service providers and end-users, including more consistent data throughout and lower latency without excessive UE power consumption or other reductions in user experience.

In addition, FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application.

In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art. The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method, performed by a network node in a wireless network, for transmitting downlink (DL) data to a user equipment (UE) in unlicensed spectrum, the method comprising:

responsive to DL data intended for the UE, transmitting a first short signal burst, to the UE, over a channel using a directional beam; and based on detecting a first response to the first short signal burst, from the UE, indicating that the channel is available, transmitting at least a portion of the DL data to the UE over the channel using the directional beam.

2. The method of embodiment 1, wherein the first short signal burst includes one or more of the following:
   a first request for the UE to perform sensing of the channel and transmit fast feedback regarding channel availability in the first response;
   a second request for the UE to provide one or more of the following information in the first response: a beam measurement report, a scheduling request, and a buffer status report;
   a first indication of time and frequency resources on which the UE should transmit the first response;
   a second indication one or more measurement types requested, including any of the following:
      energy level for the channel,
      interference level for the channel, and
      signal-to-interference-plus-noise ratio (SINR) for the channel; and
   a third indication of one or more conditions under which the UE should transmit fast feedback regarding channel availability in response to receiving a short signal burst.

3. The method of embodiment 2, wherein the first indication of time resources comprises a time offset relative to a first time resource in which the first short signal burst was transmitted.

4. The method of any of embodiments 2-3, wherein the one of more conditions, indicated by the third indication in the first short signal burst, include one or more of the following:
   an absolute threshold;
   a relative threshold; and
   an index to an entry in a table of conditions provided in a higher-layer control message.

5. The method of any of embodiments 1-4, further comprising transmitting, to the UE, a higher-layer control message that includes one or more of the following:
   a first request indicating that the UE should, when subsequently detecting a short signal burst, perform sensing of the channel and transmit fast feedback regarding channel availability;
   a second request indicating that the UE should, when subsequently detecting a short signal burst, transmit fast feedback including one or more of the following information: a beam measurement report, a scheduling request, and a buffer status report;
   a first indication of time and frequency resources on which the UE should, when subsequently detecting a short signal burst, transmit fast feedback;
   a second indication one or more measurement types that the UE should, when subsequently detecting a short signal burst, provide in the fast feedback, including any of the following:
      energy level for the channel,
      interference level for the channel, and
      signal-to-interference-plus-noise ratio (SINR) for the channel; and
   a third indication of one or more conditions under which the UE should send fast feedback regarding channel availability in response to receiving a short signal burst.

6. The method of embodiment 5, wherein the one of more conditions, indicated by the third indication in the higher-layer control message, include one or more of the following an absolute threshold;
a relative threshold; and
a table of conditions.

7. The method of any of embodiments 1-6, wherein the first response, from the UE, includes one or more of the following:
   fast feedback regarding channel availability;
   a beam measurement report;
   a scheduling request;
   a buffer status report; and
   one or more channel measurement, including any of the following:
      energy level for the channel,
      interference level for the channel, and
      signal-to-interference-and-noise ratio (SINR) for the channel.

8. The method of any of embodiments 1-7, wherein the first short signal burst also includes one more of the following:
   one or more reference signals (RS); and
   a portion of the DL data.

9. The method of any of embodiments 1-8, wherein the method further comprises:
   determining whether an expected duration of a transmission of the DL data exceeds a predetermined threshold; and
   when it is determined that the expected duration does not exceed the predetermined threshold, transmitting the DL data to the UE without transmitting the first short signal burst.

10. The method of embodiment 9, wherein the first short signal burst is transmitted to the UE when it is determined that the expected duration exceeds the predetermined threshold.

11. The method of any of embodiments 9-10, wherein:
    transmitting at least a portion of the DL data comprises transmitting a first portion of the DL data; and
    the method further comprises:
       transmitting a second short signal burst, to the UE, over the channel using the directional beam; and
       based on detecting a second response to the second short signal burst, from the UE, indicating that the channel is available, transmitting a remaining portion of the DL data to the UE over the channel using the directional beam.

12. The method of any of embodiments 1-11, further comprising performing one of the following:
    refraining from transmitting the DL data to the UE, or
    transmitting the DL data to UE using a modulation and coding scheme (MCS) that is more robust against interference,
    wherein the performing is based on one of the following:
       detecting a first response to the first short signal burst, from the UE, indicating that the channel is not available;
       a channel status report included in the first response; or
       detecting no response to the first short signal burst from the UE.

13. The method of any of embodiments 1-12, wherein transmitting the first short signal burst further comprises refraining from sensing availability of the channel, via the directional beam, before transmitting the first short signal burst.

14. The method of any of embodiments 1-13, wherein:
    the directional beam is in a first direction;
    the method further comprises, responsive to DL data intended for one or more further UEs, transmitting short signal bursts, to the respective further UEs, over respective channels using respective directional beams in respective second directions; and
at least one of the second directions is different from the first direction.

15. A method, performed by a user equipment (UE), for receiving downlink (DL) data via unlicensed spectrum from a network node in a wireless network, the method comprising:
   receiving a first short signal burst, from the network node, over a channel using a directional beam; and
   transmitting a first response to the first short signal burst, to the network node, indicating whether the channel is available.

16. The method of embodiment 15, further comprising, in response to receiving the first short signal burst, performing channel sensing to determine if the channel is available.

17. The method of any of embodiments 15-16, wherein the first short signal burst includes one or more of the following:
   a first request for the UE to perform sensing of the channel and transmit fast feedback regarding channel availability in the first response;
   a second request for the UE to provide one or more of the following information in the first response: a beam measurement report, a scheduling request, and a buffer status report;
   a first indication of time and frequency resources on which the UE should transmit the first response;
   a second indication one or more measurement types requested, including any of the following:
      energy level for the channel,
      interference level for the channel, and
      signal-to-interference-plus-noise ratio (SINR) for the channel; and
   a third indication of one or more conditions under which the UE should transmit fast feedback regarding channel availability in response to receiving a short signal burst.

18. The method of embodiment 17, wherein the first indication of time resources comprises a time offset relative to a first time resource in which the first short signal burst was transmitted.

19. The method of any of embodiments 17-18, wherein the one of more conditions, indicated by the third indication in the first short signal burst, include one or more of the following
   an absolute threshold;
   a relative threshold; and
   an index to an entry in a table of conditions provided in a higher-layer control message.

20. The method of any of embodiments 15-19, further comprising receiving, from the network node, a higher-layer control message that includes one or more of the following:
   a first request indicating that the UE should, when subsequently detecting a short signal burst, perform sensing of the channel and transmit fast feedback regarding channel availability;
   a second request indicating that the UE should, when subsequently detecting a short signal burst, transmit fast feedback including one or more of the following information: a beam measurement report, a scheduling request, and a buffer status report;
   a first indication of time and frequency resources on which the UE should, when subsequently detecting a short signal burst, transmit fast feedback;
   a second indication one or more measurement types that the UE should, when subsequently detecting a short signal burst, provide in the fast feedback, including any of the following:
      energy level for the channel,
      interference level for the channel, and
      signal-to-interference-plus-noise ratio (SINR) for the channel; and
   a third indication of one or more conditions under which the UE should send fast feedback regarding channel availability in response to receiving a short signal burst.

21. The method of embodiment 20, wherein the one of more conditions, indicated by the third indication in the higher-layer control message, include one or more of the following
   an absolute threshold;
   a relative threshold; and
   a table of conditions.

22. The method of any of embodiments 17-21, wherein:
   the one or more conditions, indicated by the third indication, include at least one of the following:
      a maximum absolute power level in the channel, and
      a minimum signal-to-interference-and-noise ratio (SINR) in the channel; and
   the method further comprises:
      based on channel measurements, determining whether one or more conditions are met; and
      when it is determined that the one or more conditions have not been met, refraining from transmitting the first response to the first short signal burst.

23. The method of embodiment 22, wherein the first response is transmitted when it is determined that the one or more conditions have been met.

24. The method of any of embodiments 15-23, wherein the first response includes one or more of the following:
   fast feedback regarding channel availability;
   a beam measurement report;
   a scheduling request;
   a buffer status report; and
   one or more channel measurements, including any of the following:
      energy level for the channel,
      interference level for the channel, and
      signal-to-interference-plus-noise ratio (SINR) for the channel.

25. The method of any of embodiments 15-24, further comprising, in response to transmitting the first response indicating that the channel is available, receiving least a portion of the DL data from the network node over the channel using the directional beam.

26. The method of embodiment 25, wherein:
   receiving at least a portion of the DL data comprises receiving a first portion of the DL data; and
   the method further comprises:
      receiving a second short signal burst, from the network node, over the channel using the directional beam;
      transmitting a second response to the second short signal burst, to the network node, indicating that the channel is available; and
      in response to transmitting the second response, receiving a remaining portion of the DL data from the network node over the channel using the directional beam.

27. The method of any of embodiments 15-26, wherein the first short signal burst also includes one more of the following:
   one or more reference signals (RS); and
   a portion of the DL data.

28. A method, performed by a network node in a wireless network, for receiving uplink (UL) data from a user equipment (UE) in unlicensed spectrum, the method comprising:

determining availability of a channel, between the network node and the UE, using a directional beam;
based on determining that the channel is available, transmitting a first resource grant for transmission of the UL data by the UE; and
receiving the UL data from the UE over the channel using the directional beam.

29. The method of embodiment 28, further comprising performing channel quality measurements for the channel and, based on the channel quality measurements, determining at least one of the following for inclusion in the first resource grant:
time and frequency resources for transmission of the UL data; and
a modulation and coding scheme (MCS) for transmission of the UL data.

30. The method of any of embodiments 28-29, wherein:
the first resource grant is a dynamic grant of resources for a single UL transmission opportunity for the UE; and
the method further comprises, in response to receiving the UL data, transmitting a second resource grant for transmission of further UL data by the UE, wherein the second resource grant includes hybrid ARQ (HARQ) feedback for the UL data.

31. The method of any of embodiments 28-29, wherein:
the first resource grant is a configured grant of resources for a plurality of UL transmission opportunities for the UE; and
the method further comprises:
responsive to the configured grant, receiving a first short signal burst, from the UE, over the channel using the directional beam;
performing channel sensing to determine if the channel is available; and
transmitting a first response to the first short signal burst, to the UE, indicating whether the channel is available.

32. The method of embodiment 31, wherein the first short signal burst includes a first request for the network node to perform sensing of the channel and send fast feedback regarding channel availability.

33. The method of any of embodiments 31-32, wherein:
the UL data is received during a first one of the UL transmission opportunities; and
the first response also includes one or more of the following:
configuration information related to one or more subsequent UL transmission opportunities, and
downlink data for the UE.

34. A method, performed by a user equipment (UE), for transmitting uplink (UL) data via unlicensed spectrum to a network node in a wireless network, the method comprising:
receiving a first resource grant for transmission of UL data by the UE;
responsive to the resource grant, transmitting a first short signal burst, to the network node, over a channel using a directional beam; and
based on detecting a first response to the first short signal burst, from the network node, indicating that the channel is available, transmitting at least a portion of the UL data to the network node over the channel using the directional beam.

35. The method of embodiment 34, wherein the first resource grant is a configured grant of resources for a plurality of UL transmission opportunities for the UE.

36. The method of claim 35, wherein:
the UL data is transmitted during a first one of the UL transmission opportunities; and
the first response also includes one or more of the following:
configuration information related to one or more subsequent UL transmission opportunities, and
downlink data for the UE.

37. The method of any of embodiments 34-36, wherein the first short signal burst includes a first request for the network node to perform sensing of the channel and send fast feedback regarding channel availability.

38. The method of any of embodiments 34-37, further comprising performing one of the following:
refraining from transmitting the UL data to the network node, or
transmitting the UL data to network node using a modulation and coding scheme (MCS) that is more robust against interference,
wherein the performing is based on one of the following:
detecting a first response to the first short signal burst, from the network node, indicating that the channel is not available;
a channel status report included in the first response; or
detecting no response to the first short signal burst from the network node.

39. A network node, in a wireless network, configured to transmit downlink (DL) data and/or received uplink (UL) data with user equipment (UEs), the network node comprising:
radio network interface circuitry configured to communicate with one or more UEs; and
processing circuitry operatively coupled to the radio network interface circuitry, whereby the processing circuitry and the radio network interface circuitry are configured to perform operations corresponding to any of the methods of embodiments 1-14 and 28-33.

40. A network node, in a wireless network, configured to transmit downlink (DL) data and/or received uplink (UL) data with user equipment (UEs), the network node being further arranged to perform operations corresponding to any of the methods of embodiments 1-14 and 28-33.

41. A non-transitory, computer-readable medium storing computer-executable instructions that, when executed by processing circuitry of a network node in a wireless network, configure the network node to perform operations corresponding to any of the methods of embodiments 1-14 and 28-33.

42. A computer program product comprising computer-executable instructions that, when executed by processing circuitry of a network node in a wireless network, configure the network node to perform operations corresponding to any of the methods of embodiments 1-14 and 28-33.

43. A user equipment (UE) configured to receive downlink (DL) data and/or transmit uplink (UL) data in a wireless network, the UE comprising:
radio transceiver circuitry configured to communicate with a network node in the wireless network; and
processing circuitry operatively coupled to the radio transceiver circuitry, whereby the processing circuitry and the radio transceiver circuitry are configured to perform operations corresponding to any of the methods of embodiments 15-27 and 34-38.

44. A user equipment (UE) configured to receive downlink (DL) data and/or transmit uplink (UL) data in a wireless network, the UE being further arranged to perform operations corresponding to any of the methods of embodiments 15-27 and 34-38.

45. A non-transitory, computer-readable medium storing computer-executable instructions that, when executed by processing circuitry of a user equipment (UE) configured to receive downlink (DL) data and/or transmit uplink (UL) data in a wireless network, configure the UE to perform operations corresponding to any of the methods of embodiments 15-27 and 34-38.

46. A computer program product comprising computer-executable instructions that, when executed by processing circuitry of a user equipment (UE) configured to receive downlink (DL) data and/or transmit uplink (UL) data in a wireless network, configure the UE to perform operations corresponding to any of the methods of embodiments 15-27 and 34-38.

47. A communication system including a host computer, the host computer comprising:
　a. processing circuitry configured to provide user data; and
　b. a communication interface configured to forward the user data to a cellular network for transmission to a user equipment (UE) through a core network (CN) and a radio access network (RAN);
　wherein:
　c. the RAN comprises a first node;
　d. the first node comprises a communication transceiver and processing circuitry configured to perform operations corresponding to any of the methods of embodiments 1-14 and 28-33.

48. The communication system of the previous embodiment, further comprising the UE.

49. The communication system of any of the previous two embodiments, wherein:
　e. the processing circuitry of the host computer is configured to execute a host application, thereby providing the user data; and
　f. the UE comprises processing circuitry configured to execute a client application associated with the host application.

50. The communication system of any of the previous two embodiments, wherein the UE comprises processing circuitry configured to perform operations corresponding to any of the methods of embodiments 15-27 and 34-38.

51. A method implemented in a communication system including a host computer, a cellular network, and a user equipment (UE), the method comprising:
　a. at the host computer, providing user data;
　b. at the host computer, initiating a transmission carrying the user data to the UE via a cellular network comprising a radio access network (RAN); and
　c. operations, performed by a first node of the RAN, corresponding to any of the methods of embodiments 1-14 and 28-33.

52. The method of the previous embodiment, wherein the data message comprises the user data, and further comprising transmitting the user data to the UE via the first node.

53. The method of any of the previous two embodiments, wherein the user data is provided at the host computer by executing a host application, the method further comprising, at the UE, executing a client application associated with the host application.

54. The method of any of the previous three embodiments, wherein the method further comprises, at the UE, performing operations corresponding to any of the methods of embodiments 15-27 and 34-38.

55. A communication system including a host computer comprising a communication interface configured to receive user data originating from a transmission from a user equipment (UE) via a first node in a radio access network (RAN), wherein:
　a. the first node comprises a communication interface and processing circuitry configured to perform operations corresponding to any of the methods of embodiments 1-14 and 28-33.

56. The communication system of the previous embodiment, further including the UE.

57. The communication system of any of the previous two embodiments, wherein:
　c. the processing circuitry of the host computer is configured to execute a host application;
　d. the UE comprises processing circuitry configured to execute a client application associated with the host application, thereby providing the user data to be received by the host computer.

58. The method of any of the previous two embodiments, wherein the UE comprises processing circuitry configured to perform operations corresponding to any of the methods of embodiments 15-27 and 34-38.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:
1. A method performed by a network node for transmitting downlink (DL) data to a user equipment (UE) in unlicensed spectrum in a wireless network, the method comprising:
　responsive to DL data intended for the UE, transmitting a first short signal burst to the UE over a channel using a directional beam; and
　based on detecting a first response from the UE to the first short signal burst, the first response indicating that the channel is available, transmitting at least a portion of the DL data to the UE over the channel using the directional beam, wherein transmitting the first short signal burst further comprises:
　before transmitting the first short signal burst, determining whether one or more of the following conditions are met: an expected duration of a transmission of the DL data does not exceed a predetermined threshold, and the network node is in an interference-free environment; and
　when it is determined that the one or more conditions are met, refraining from transmitting the first short signal burst, such that transmitting the DL data to the UE is performed independent of a first response from the UE to the first short signal burst.

2. The method of claim 1, wherein the first short signal burst includes one or more of the following:
　a first request for the UE to perform sensing of the channel and to transmit fast feedback regarding channel availability;

a second request for the UE to provide one or more of the following information: a beam measurement report, a scheduling request, and a buffer status report;
a first indication of time and frequency resources on which the UE should transmit fast feedback regarding channel availability;
a second indication of one or more measurement types requested, including any of the following: energy level for the channel, interference level for the channel, and signal-to-interference-and-noise ratio (SINR) for the channel; and
a third indication of one or more conditions under which the UE should transmit fast feedback regarding channel availability in response to receiving a short signal burst.

3. The method of claim 1, further comprising transmitting, to the UE, a higher-layer control message that includes a configuration for one or more of the following:
a first request indicating that the UE should, upon detecting a short signal burst, perform sensing of the channel and transmit fast feedback regarding channel availability;
a second request indicating that the UE should, upon detecting a short signal burst, transmit fast feedback including one or more of the following information: a beam measurement report, a scheduling request, and a buffer status report;
a first indication of time and frequency resources on which the UE should transmit fast feedback upon detecting a short signal burst;
a second indication of one or more measurement types that the UE should provide in the fast feedback upon detecting a short signal burst, including any of the following: energy level for the channel, interference level for the channel, and signal-to-interference-and-noise ratio (SINR) for the channel; and
a third indication of one or more conditions under which the UE should send fast feedback regarding channel availability in response to receiving a short signal burst.

4. The method of claim 1, wherein transmitting the first short signal burst is based on determining that the one or more conditions are not met.

5. The method of claim 1, wherein:
transmitting at least a portion of the DL data comprises transmitting a first portion of the DL data; and the method further comprises: transmitting a second short signal burst to the UE over the channel using the directional beam; and based on detecting a second response from the UE to the second short signal burst, the second response indicating that the channel is available transmitting a remaining portion of the DL data to the UE over the channel using the directional beam.

6. The method of claim 1, wherein:
the method further comprising performing one of the following operations:
refraining from transmitting the DL data to the UE, or
transmitting the DL data to UE using a modulation and coding scheme (MCS) that best matches the reported channel status; and
performing the operation is based on one of the following:
detecting a first response from the UE to the first short signal burst, wherein the first response indicates that the channel is not available;
a channel status report included in the first response; or
detecting no response to the first short signal burst from the UE.

7. The method of claim 1, wherein transmitting the first short signal burst further comprises refraining from sensing availability of the channel, via the directional beam, before transmitting the first short signal burst.

8. The method of claim 1, wherein:
the directional beam is in a first direction;
the method further comprises, responsive to DL data intended for one or more further UEs, transmitting short signal bursts, to the respective further UEs, over respective channels using respective directional beams in respective second directions; and
at least one of the second directions is different from the first direction.

9. A method performed by a user equipment (UE) for receiving downlink (DL) data via unlicensed spectrum from a network node in a wireless network, the method comprising:
receiving a first short signal burst, from the network node, over a channel using a directional beam; and
transmitting to the network node a first response to the first short signal burst, wherein the first response indicates whether the channel is available, wherein:
receiving at least a portion of the DL data comprises receiving a first portion of the DL data; and
the method further comprises:
receiving a second short signal burst from the network node over the channel using the directional beam;
transmitting to the network node a second response to the second short signal burst, wherein the second response indicates that the channel is available; and
subsequently receiving a remaining portion of the DL data from the network node over the channel using the directional beam.

10. The method of claim 9, further comprising, in response to receiving the first short signal burst, performing channel sensing to determine whether the channel is available.

11. The method of claim 9, wherein the first short signal burst includes one or more of the following:
a first request for the UE to perform sensing of the channel and to transmit fast feedback regarding channel availability;
a second request for the UE to provide one or more of the following information: a beam measurement report, a scheduling request, and a buffer status report;
a first indication of time and frequency resources on which the UE should transmit fast feedback regarding channel availability;
a second indication of one or more measurement types requested, including any of the following: energy level for the channel, interference level for the channel, and signal-to-interference-and-noise ratio (SINR) for the channel; and
a third indication of one or more conditions under which the UE should transmit fast feedback regarding channel availability in response to receiving a short signal burst.

12. The method of claim 9, further comprising receiving, from the network node, a higher-layer control message that includes a configuration for one or more of the following:
a first request indicating that the UE should, upon detecting a short signal burst, perform sensing of the channel and transmit fast feedback regarding channel availability;
a second request indicating that the UE should, upon detecting a short signal burst, transmit fast feedback including one or more of the following information: a beam measurement report, a scheduling request, and a buffer status report;

a first indication of time and frequency resources on which the UE should transmit fast feedback upon detecting a short signal burst;

a second indication of one or more measurement types that the UE should provide in the fast feedback upon detecting a short signal burst, including any of the following: energy level for the channel, interference level for the channel, and signal-to-interference-and-noise ratio (SINR) for the channel; and a third indication of one or more conditions under which the UE should send fast feedback regarding channel availability in response to receiving a short signal burst.

13. The method of claim 9, further comprising, in response to transmitting the first response indicating that the channel is available, receiving least a portion of the DL data from the network node over the channel using the directional beam.

14. A method performed by a network node for receiving uplink (UL) data from a user equipment (UE) in unlicensed spectrum in a wireless network, the method comprising:

using a directional beam, determining availability of a channel between the network node and the UE;

based on determining that the channel is available, transmitting to the UE a first resource grant for transmission of the UL data by the UE;

receiving the UL data from the UE over the channel using the directional beam; and in response to receiving the UL data, transmitting a second resource grant for transmission of further UL data by the UE, the second resource grant comprises hybrid ARQ (HARQ) feedback for the UL data.

15. The method of claim 14, further comprising:

performing channel quality measurements for the channel; and based on the channel quality measurements, determining at least one of the following information that is included in the first resource grant:

time and frequency resources for transmission of the UL data; and a modulation and coding scheme (MCS) for transmission of the UL data.

16. A method performed by a user equipment (UE) for transmitting uplink (UL) data via unlicensed spectrum to a network node in a wireless network, the method comprising:

receiving from the network node a first resource grant for transmission of UL data by the UE;

responsive to the resource grant, transmitting to the network node a first short signal burst over a channel using a directional beam; and based on detecting a first response from the network node to the first short signal burst, the first response indicating that the channel is available, transmitting at least a portion of the UL data to the network node over the channel using the directional beam, based on detecting a first response to the first short signal burst indicating that the channel is not available, detecting a first response to the first short signal burst indicating a different frequency resource and/or a different modulation and coding scheme (MCS) to be used for transmitting the UL data, and/or detecting no response to the first short signal burst.

17. A network node configured to transmit downlink (DL) data to a user equipment (UE) in unlicensed spectrum in a wireless network, the network node comprising:

radio network interface circuitry configured to communicate with one or more UEs; and processing circuitry operatively coupled to the radio network interface circuitry, whereby the processing circuitry and the radio network interface circuitry are configured to perform operations corresponding to the method of claim 1.

18. A user equipment (UE) configured to receive downlink (DL) data via unlicensed spectrum from a network node in a wireless network, the UE comprising:

radio transceiver circuitry configured to communicate with the network node; and processing circuitry operatively coupled to the radio transceiver circuitry, whereby the processing circuitry and the radio transceiver circuitry are configured to perform operations corresponding to the method of claim 9.

* * * * *